(12) United States Patent
Simmons et al.

(10) Patent No.: US 11,042,641 B2
(45) Date of Patent: Jun. 22, 2021

(54) DEPLOYMENT AND COMMUNICATIONS GATEWAY FOR DEPLOYMENT, TRUSTED EXECUTION, AND SECURE COMMUNICATIONS

(71) Applicant: AMARI.AI INCORPORATED, Littleton, CO (US)

(72) Inventors: Jonathan Alan Simmons, Littleton, CO (US); Eddie B. Satterly, Guffey, CO (US)

(73) Assignee: AMARI.AI INCORPORATED, Littleton, CO (US)

( * ) Notice: Subject to any disclaimer, the term of this patent is extended or adjusted under 35 U.S.C. 154(b) by 0 days.

(21) Appl. No.: 16/567,251

(22) Filed: Sep. 11, 2019

(65) Prior Publication Data

US 2020/0082087 A1    Mar. 12, 2020

Related U.S. Application Data

(60) Provisional application No. 62/729,835, filed on Sep. 11, 2018.

(51) Int. Cl.
*G06F 21/00* (2013.01)
*G06F 21/57* (2013.01)
(Continued)

(52) U.S. Cl.
CPC .............. *G06F 21/57* (2013.01); *G06F 21/53* (2013.01); *G06F 21/6245* (2013.01);
(Continued)

(58) Field of Classification Search
CPC .............................. G06F 21/6245; G06F 21/53
(Continued)

(56) References Cited

U.S. PATENT DOCUMENTS 9,578,017 B2    2/2017   Ferguson et al.
9,608,825 B2    3/2017   Sarangdhar et al.
(Continued)

FOREIGN PATENT DOCUMENTS

WO    2018153485 A1    8/2018

OTHER PUBLICATIONS

PCT Search Report from corresponding PCT Application No. PCT/US2019/050635, dated Nov. 20, 2019.
(Continued)

*Primary Examiner* — Anthony D Brown
(74) *Attorney, Agent, or Firm* — Holzer Patel Drennan

(57) ABSTRACT

A trusted deployment and communications gateway for deployment, trusted execution, and secure communications system includes a trusted platform for deployment of trusted applications. The trusted platform may include a secure user profile comprising user data specifications that is stored in a secure storage location of the trusted platform, a kernel development engine configured to receive various application program instructions within a trusted environment, a testing and signing module configured to generate signed application program instructions in response to determining that the application program instructions do not violate one or more of the data specifications, a compiler configured to compile the signed application program instructions to generate a signed application kernel, and a kernel store configured to store the signed application kernels that are executable in the trusted platform.

22 Claims, 17 Drawing Sheets

(51) Int. Cl.
*G06F 21/62* (2013.01)
*G06F 21/53* (2013.01)
*H04L 9/32* (2006.01)
*H04L 29/06* (2006.01)

(52) U.S. Cl.
CPC .......... *H04L 9/3234* (2013.01); *H04L 9/3247* (2013.01); *H04L 63/102* (2013.01); *H04L 63/105* (2013.01); *H04L 2209/127* (2013.01)

(58) Field of Classification Search
USPC ........................................................ 713/164
See application file for complete search history.

(56) References Cited

U.S. PATENT DOCUMENTS

| | | | |
|---|---|---|---|
| 9,635,021 B2 | 4/2017 | Smith | |
| 9,774,573 B2 | 9/2017 | Hitchcock et al. | |
| 9,798,895 B2 | 10/2017 | Nayshtur et al. | |
| 2003/0051171 A1 | 3/2003 | Pearson | |
| 2006/0026418 A1* | 2/2006 | Bade | H04L 63/102 713/150 |
| 2006/0242406 A1 | 10/2006 | Barde et al. | |
| 2008/0109636 A1 | 5/2008 | Wilson et al. | |
| 2009/0089579 A1 | 4/2009 | Murase et al. | |
| 2009/0119772 A1 | 5/2009 | Awad et al. | |
| 2013/0227264 A1* | 8/2013 | Kim | G06F 21/575 713/2 |
| 2014/0150116 A1 | 5/2014 | Edwards | |
| 2017/0140375 A1 | 5/2017 | Kunstel | |
| 2017/0187748 A1 | 6/2017 | Durand et al. | |
| 2017/0230353 A1 | 8/2017 | Kurian et al. | |
| 2018/0018665 A1* | 1/2018 | Chene | G06F 21/35 |
| 2018/0227275 A1 | 8/2018 | Russinovich et al. | |
| 2018/0239897 A1 | 8/2018 | Ventura | |
| 2018/0254898 A1 | 9/2018 | Sprague et al. | |

OTHER PUBLICATIONS

PCT Written Opinion from corresponding PCT Application No. PCT/US2019/050635, dated Nov. 20, 2019.

Zyskind et al. Decentralizing privacy: Using blockchain to protect personal data, Security and Privacy Workshops (SPW) 2015 IEEE, May 21, 2015, pp. 180-184 [online], [retrieved on Sep. 24, 2018]. Retrieved from the Internet: <URL:http://homepage.divms.uiowa.edu/~ghosh/blockchain.pdf>.

Azaria et al. Medrec: Using blockchain for medical data access and permission management, Open and Big Data (OBD), International Conference on, IEEE, Aug. 22, 2016, pp. 25-30, [retrieved on Sep. 24, 2018]. Retrieved from the Internet: <URL:http://kddlab.zigsu.edu.cn:7200/research/blockchain/huyiyang-reference/MedRec%20Using%20Blockchain%20for%20Medical%20Data%20Access%20and%20Permission%20Management.pdf>.

Lind et al. Teechain: Scalable blockchain payments using trusted execution environments, Jul. 18, 2017 [retrieved on Sep. 10, 2019]. Retrieved from the Internet: <URL:https://www.docic.ac.uk—fkelbert/papers/teechainarxiv17.pdf>.

Brandenburger et al. Blockchain and Trusted Computing: Problems, Pitfalls, and a Solution for Hyperledger Fabric, May 22, 2018 [retrieved on Sep. 24, 2018]. Retrieved from the Internet: <URL:https://arxiv.org/pdf/1805.08541.pdf>.

Li et al. A survey on the security of blockchain systems, Future Generation Computer Systems, Aug. 20, 2017 [retrieved on Sep. 10, 2019]. Retrieved from the Internet: <URL:http://isiarticles.com/bundles/Article/pre/pdf/140929.pdf>.

* cited by examiner

DEPLOYMENT AND COMMUNICATIONS GATEWAY FOR DEPLOYMENT, TRUSTED EXECUTION, AND SECURE COMMUNICATIONS

CROSS-REFERENCE TO RELATED APPLICATIONS

The present application claims benefit of priority to U.S. Provisional Patent Application No. 62/729,835, entitled "SECURE IDENTITY GATEWAY" and filed on 11 Sep. 2018, which is specifically incorporated by reference herein for all that it discloses or teaches.

The present application is also related to U.S. patent application Ser. No. 16/567,263 entitled "SECURE COMMUNICATIONS GATEWAY FOR TRUSTED EXECUTION AND SECURE COMMUNICATIONS" filed Sep. 11, 2019, which is specifically incorporated by reference herein for all that it discloses or teaches.

BACKGROUND

Various applications that use customer data are generally implemented using client server model where a client device communicates with the application implemented on the server. In such implementations, the client device may have a client application that collects various user and user device data and communicates such user and user device data to the application server. Subsequently the user data may be stored on the application server. As a result, the application provider gains access to and control over the user data at both the device level and at the server.

In such implementations, users are expected to rely on and trust the application provider to manage the security and privacy of the user data. However, as user data security and privacy are becoming more important in modern digital economies, users trust the application providers less and less in guaranteeing the security and privacy of their data.

Furthermore, with the regulations such as the General Data Privacy Regulation (GDPR) enacted by the European Union, the application providers have the added burden of managing control, and/or use of user data. Furthermore, GDRP and other data privacy and security regulations also add substantial liabilities to application providers collecting, using, and/or storing user data. Often the application providers do not have the capability to or they are not interested in dealing with user data security and privacy given the potential liability resulting from any breach of the regulations and/or misuse of the user data. This presents potential complications for application providers and other entities receiving user data when they cannot provide control over their users' data. Therefore, solutions for deployment of applications that guarantees security and privacy of user data while relieving the burden on the application providers to ensure such security and privacy are needed.

SUMMARY

The present disclosure relates to a trusted deployment and communications gateway for deployment, trusted execution, and secure communications system includes a trusted platform for deployment of trusted applications. The trusted platform may include a secure user profile comprising user data specifications that is stored in a secure storage location of the trusted platform, a kernel development engine configured to receive various application program instructions within a trusted environment, a testing and signing module configured to generate signed application program instructions in response to determining that the application program instructions do not violate one or more of the data specifications, a compiler configured to compile the signed application program instructions to generate a signed application kernel, and a kernel store configured to store the signed application kernels that are executable in the trusted platform.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
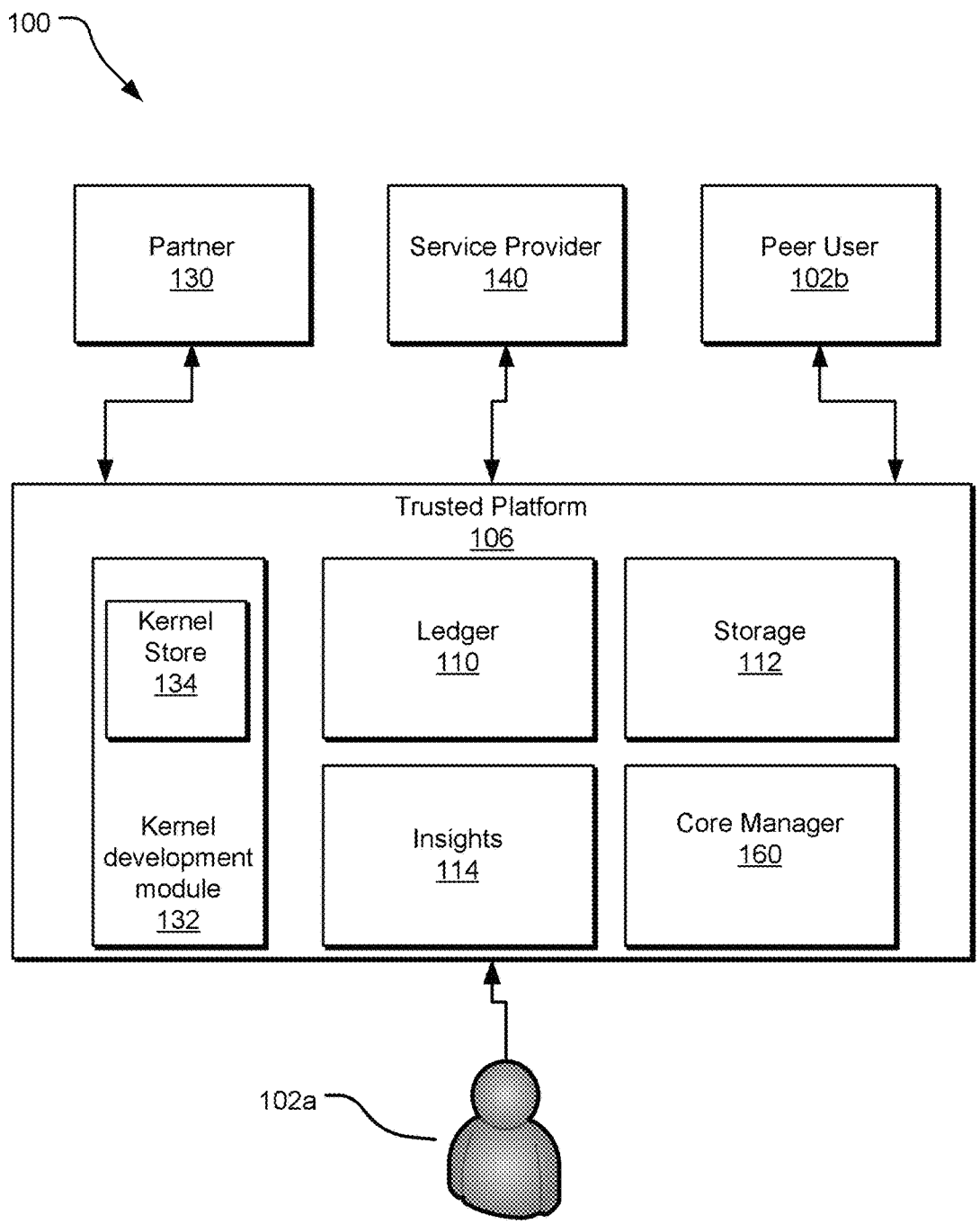
FIG. 1 illustrates an example of a secure communication system including a trusted platform.

FIG. 1 illustrates an example of a secure communication system 100. The secure communication system 100 includes a trusted platform 106 that may maintain, and control access to, user data of a user 102a of the secure communication system 100. Specifically, the user data may be stored in storage 112 of the trusted platform 106. A platform execution environment 160 may control access to the user data provided in the storage 112. In turn, one or more partners 130, one or more service providers 140, and/or one or more peer users 102b may request access to user data for the user 102a. The platform execution environment 160 may execute programs adapted for execution in the platform execution environment 160 to determine whether to, and/or to what extent to, manifest the user data to a requesting entity at least in part based on a request received to access the user data in view of one or more access permission parameters of the user 102a maintained at the trusted platform 106.

The trusted platform 106 may also have a ledger 110. The ledger 110 may provide an auditable record of all activity of the trusted platform. Accordingly, all requests, user data manifests, and other information may be recorded in the ledger 110 of the trusted platform 106. This may provide an auditable environment in which any and all requests or data transactions are recorded to provide heightened security to a user 102a.

As will also be described in greater detail below, the trusted platform 106 may include an insights module 114 that may be used to aggregate anonymized user data that may be used to determine aggregate user preference information across a number of users without compromising individual user data security. Participation, including what user data can be shared in the insights module 114, may be wholly controlled by the user 102a such that the user elections for participation in manifesting data to the insights module 114 is completely controlled by the user 102a. This may allow a user to make informed determinations that balance benefits in participation in the insights module 114 (e.g., potentially including tailored recommendations or experiences to the user 102a) with a user's desired security or privacy posture.

The secure communication system 100 may facilitate an improved environment that allows a user to control the manner in which user data is manifested to third parties that departs, at least in part, from the existing user data paradigm. For example, as described above, many current approaches to user data requires a user to provide user data to third parties with little or no control over the user data once provided. For example, when utilizing an application developed by a third party on a user device, a user may have limited control over the user data that the application has access to on the user's device. Moreover, once provided access to user data, the third party that collects the user data may copy, store, and otherwise use the user's data in a manner in which the user may or may not be aware. For example, while third parties may post terms regarding data use or user privacy, such terms may be subject to change and may not be evident when a user elects to share data. Moreover, even if the user is aware of the manner in which their data is used, if the user later decides to no longer utilize the third party's application or no longer wishes for the third party to have the user's data, there may be little or no recourse on the part of the user to preclude continued use of the user's data or document a request to no longer use/store a user's data by the third party. In short, under current user data management paradigms, a user may have limited awareness of what parties have access to their data and may have little or no control over their data once provided to a third party.

In contrast, using the secure communication system 100, user data may be securely stored in secure storage 112 of the trusted platform 106. Rather than directly providing data to third parties, a user may direct all requests for user data to the trusted platform 106 that may be used to determine whether and/or to what extent to provide access to user data in storage 112 of the trusted platform 106. As may be appreciated in connection with the discussion below, this may allow a user to exercise far greater control over their user data.

In addition, all communication in the secure communication system 100 may be provided by secure means. For example and as will be described in greater detail below, any communication between an entity external to the trusted platform 106 and the trusted platform 106 may include accessing a security gateway to establish a secure communication connection with the trusted platform 106. The secure communications channels established in the secure communication system 100 may assist in reducing or eliminating the possibility of a malicious third party from surreptitiously accessing data when exchanged between authorized parties in the secure communication system 100. In turn, the trusted platform 106 may provide an audited secure communications profile for any interaction with or between components of the trusted platform 106. The trusted platform 106 may provide a secure identity gateway that provides a user 102a control over the manner in which user data for the user 102a is manifested to third parties or the trusted platform 106 itself.

In one implementation, the trusted platform 106 may also include a kernel development module 132 that includes components of the trusted 106 platform that are used to build, certify, and make ready for deployment any application kernel. The kernel development module 132 may include specific components of the deployment, trusted execution, and secure communications of a secure identity gateway platform designed to run on one or more computer systems as it relates to a standard development environment for the partners and service providers that are a part of the deployment, trusted execution, and secure communications of the secure identity gateway platform.

Various partners 130 may use the kernel deployment module 132 to generate trusted and signed application kernels that can be used to access insights 114. In one implementation, a partner 130 interested in deploying an application kernel may use an application development engine (discussed in further detail below in FIG. 3) of the kernel deployment module 132 to generate and deploy such application kernels. Once the partner 130 generates and submits various instructions that will be used to implement the application kernel, the kernel deployment module 132 verifies the instructions to insure that the application kernel will operate in compliance with various data specifications for the user data stored in the storage 112.

For example, such data specification for data of a particular user 102 may specify that the certain of the user data, as specified by the user or as per the default policy of the trusted platform 106, is never shared with any partner 130. As an example, the user 102 may have specified their credit card information as level A data never to be shared with a partner 130 that is a social networking service provider or an any applications developed by such partners. In such a case, if there is any instruction submitted by a partner 130, that is a social networking service provider, to the kernel development module 132 accesses such credit card information, the kernel development module 132 may remove such instruction from the application program and/or send a request to the partner to revise the application program instructions.

Once the application program instructions from the partner 130 are verified for their compliance with the policies of the trusted platform 106 and the user data specifications, a compiler compiles the application program instructions to generate a verified application kernel. The kernel development module 132 runs the verified application kernel in a test environment on the trusted platform 106 for test and certification process. The test and certification process may include testing the compliance with user protection and the developer test cases as submitted. This will either result in a pass or fail and if the code passes it will be submitted to a signed code repository for more compliance review and if it fails notification will be sent back to the developer and the code will be kept in the development environment. The process on a fail will request that the developer resubmits an update kernel with the noted failed controls addressed. This process ensures user controls of data flows and protection for the user.

Once the verified application kernel has passed the automated testing, its compliance with secure communication protocols used by the trusted platform is verified. Upon successful testing the verified application kernel is signed and it is submitted to a kernel store 134 as signed application kernel. The signed application kernel is made available to the partner 130 and user 102. For example, the partner 130 may be able to use the signed application kernel for its users. Similarly, the user 102 may be able to deploy a client version of the application program on their mobile device and use the client version to communicate with the signed application kernel deployed in the kernel store 134.

The deployment of the signed application kernel in the kernel store 134 is recorded in a ledger. Furthermore, all execution of and access to the signed application kernels in the kernel store 134 may also be tracked to verify continued compliance of the signed application kernels' with user data specifications and with trusted platform 106's secure communication protocols.

Figure 2:
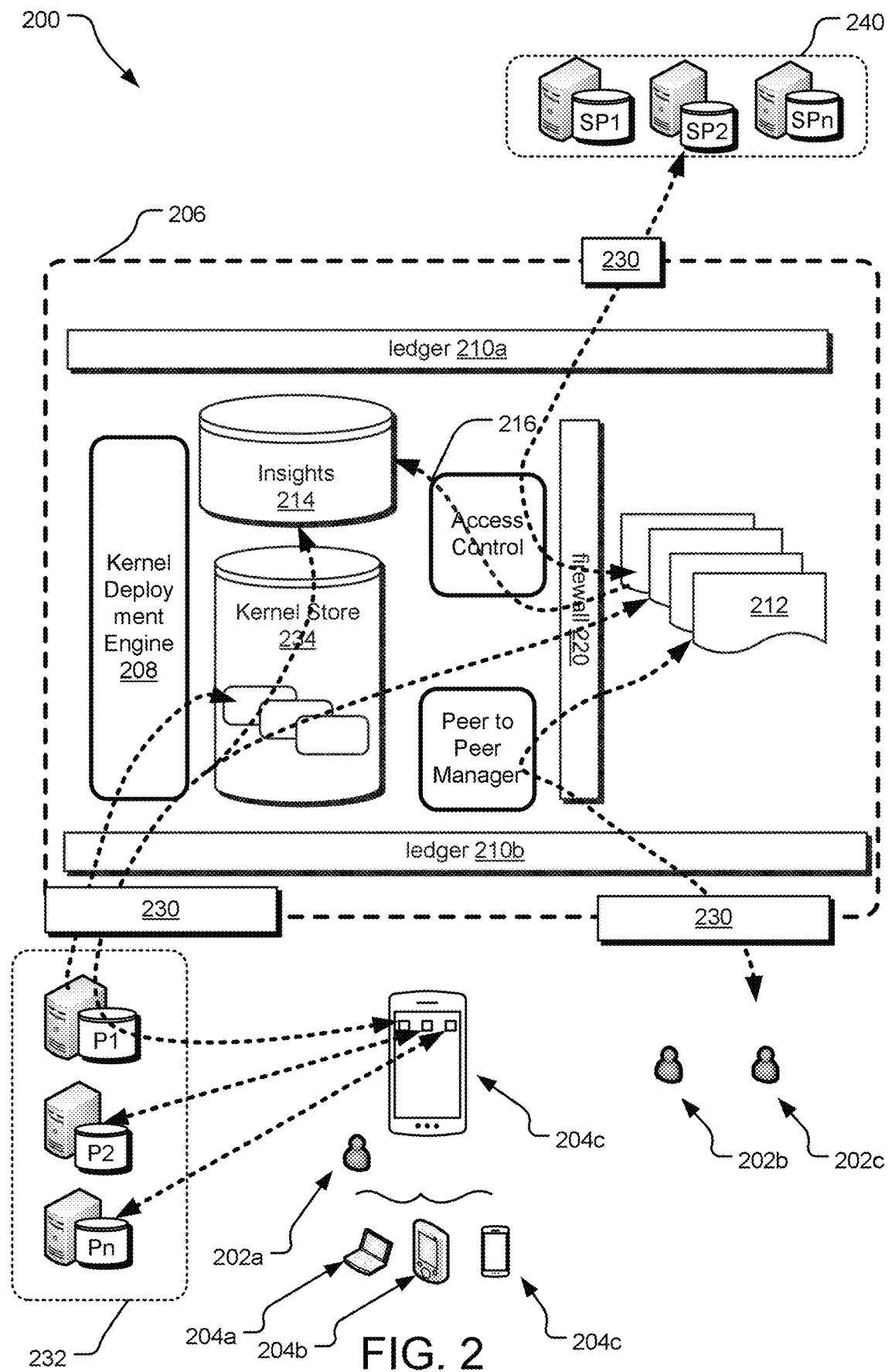
FIG. 2 illustrates an example of a trusted deployment and execution platform.

With further reference to FIG. 2, a more detailed schematic view of a trusted platform 206 is shown in the context of a secure communication system 200. A user 202a of the trusted platform 206 may utilize one or more user devices 204a, 204b, or 204c for use in accessing the trusted platform 206. As described in greater detail below, the each user device 204a, 204b, 204c may have deployed thereon appropriate software or other program to facilitate interaction with the trusted platform 206 that may allow a user 202a to interact with the trusted platform 206.

The trusted platform 206 may be accessed by a number of users 202a, 202b, and 202c. Each user 202a, 202b, and 202c may have a unique secure user profile 212 stored in the trusted platform 206. Each unique secure user profile 212 may be isolated in secure storage such that only the respective user 202 corresponding to a secure user profile 212 may have permission to manifest access and/or manage the secure user profile 212. For example and as discussed in greater detail below, each user secure user profile 212 may comprise a trusted execution environment (TEE) and/or secure storage. In this regard, a firewall 120 is shown in FIG. 2 to illustrate that each secure user profile 212 may be securely isolated within the trusted platform 206 to provide a unique secure execution and storage space for each user 202 of the trusted platform 206. While the firewall 120 illustrates secure isolation of the secure user profiles 212 from the other components of the trusted platform 206, it may also be appreciated that each secure user profile 212 may also be securely isolated from other secure user profiles 212. Each secure user profile 212 may have appropriate security provisions to preclude access to the secure user profile 212 by others than those authorized by a corresponding user 202 for the secure user profile 212.

The secure communication system 200 may be in communication with one or more service providers 240 and/or one or more partners 232. As will be described in greater detail below, any of a service provider 240, partner 242, or peer user 202b, 202c may request access to requested user data of a secure user profile 212 of the trusted platform 206. Access to the requested user data of the secure user profile 212 may be controlled based on access permission parameters such that only access permitted by a user 202 for the secure user profile 212 may authorize such access.

A user may have control over various manners in which user data is manifested to third parties. For example, a user may elect to grant user data with a third party. When sharing user data, the requested user data may be retrieved from the secure user profile 212 and communicated to the requesting third party. When providing user data to a third party in connection with a share or grant of user data, the trusted platform 206 may include in the communication an indication of a permitted use of the shared or granted user data. In this regard, while a share of user data may manifest the user data outside of the trusted platform 206, the user data provided may at least be limited in the permitted use of the user data, which may be recorded in the ledger 210 when providing the user data to the third party. Alternatively, a user may provide a share of access to third parties. This may allow the third party to execute against the requested user data in the secure user profile 212. In this regard, the requested user data may remain only in the secure user profile 212, and the requestor may be provided access to the requested user data in the secure user profile 212 according to access permission parameters. In the case of share of access to requested user data, all data may remain only stored in the secure user profile 212. In either the case of a share or a grant, a user may later revoke the permission previously provided. In the case of a share, such a revocation may be effectuated in the trusted platform 206 by disallowing any access to the user data by the third party whose share of access has been revoked. Such a revocation may be recorded in the ledger 210. In the case of a grant, upon revocation, a message may be provided to the third party to no longer user and return and/or destroy the user data provided in a prior grant. Alternatively, a revocation message may be provided that imposes greater limits on the permitted use of the data. Either type of revocation message may be recorded in the ledger 210. Either a grant or a share can be provided to any level of data per metadata tags, entire profiles, or specific data needed by the partner to complete a required action. For example, if a restaurant app needs your preferred food and price preferences to provide recommendations the user can share just that information with that service provider or partner. Further discussion regarding use of metadata tags for data at different respective security levels is described in greater detail below.

In order to facilitate control over the secure user profiles 212, the trusted platform 206 may include a number of control programs that execute to securely manage access to the secure user profiles 212. In this regard, the trusted platform 206 may include a platform execution environment 260 in which a number of trusted platform components may be executed. The platform execution environment 260 facilitate execution of an access control manager 262 for processing requests received for access to user data from service providers 240. A peer to peer manager 264 may execute in the platform execution environment 260 for processing requests received for user data from peer users 202b and 202c. More detailed operation of the access control manager 262 and the peer to peer manager 264 are described in greater detail below. In one example, the access control manager 262 and the peer to peer manager 264 may be available as signed programs in a kernel store 234 that are optionally executed and/or controlled by a user 202a for controlling access to a corresponding secure user profile 212 for the user 202a. Preferences are pushed down from the access control manager 262 to user devices 204a, 204b, 204c as a component of the kernel, deployed from the kernel store 234. For instance, a mini-kernel corresponding to the access control manager 262 may also be deployed to one or more of the user's devices 204a, 204b, and 204c that may receive preferences from the access control manager 262 of the trusted platform 206. These preferences allow the mini-kernel on the user's device 204a, 204b, 204c to execute without connection back to the trusted platform 106 (e.g., while in offline mode or to conserve use of bandwidth). The preferences will be automatically updated when the device is connected back to the trusted platform 106 or as needed (e.g., to obtain preferences related to a new request that requires user intervention to establish the preferences).

In an example, the programs executing in the platform execution environment or a TEE of a secure user profile 212 may be a kernel program or "kernel." In this regard, the kernels may comprise low level abstraction layers executed in the respective execution environments, thus allowing for secure execution in the platform execution environment 260 or the secure user profile 212 (e.g., a TEE thereof).

The kernel store 234 may also include one or more partner programs (not shown in FIG. 2). A partner 232 may develop a program for execution in an execution environment of the trusted platform 206. Specifically, the partner 232 may submit the partner program to a kernel deployment engine 208, which may test and certify the partner program prior to deploying the partner program into the kernel store 234. Implementations and functioning of the kernel deployment engine 208 are disclosed in further detail below in FIGS. 3-8. In any regard, a partner program may be provided from the kernel store 234 for execution in an execution environment of the trusted platform 206 in a manner that is certified through testing and documented through audited secure communication.

Communication between components of the trusted platform 206 and between third parties and the trusted platform 206 may be by way of a secure communication protocol. For example, a proprietary secure communication protocol may include one or more of a virtual private network or encrypted communication channels. In turn, each user 202 may communicate securely with the trusted platform 206 by way of a secure gateway 230. Moreover, all communication between partners 232 and the trusted platform 206 may also be by way of a secure gateway 230. Further still, all communication between a service provider 240 and the trusted platform 206 may be way of a secure gateway. The secure gateways 230 may require an authenticated secure communication protocol. This may reduce or eliminate the potential for side channel taking of user data when communicated outside the trusted platform 206. That is, the use of the secure gateways 230 for communication with the trusted platform 206 may extend the data security of the user data when such user data is communicated to a peer user 202b, 202c, a partner 232, or a service provider 240 that is authenticated using the secure communication protocol for communication via the secure gateway 230. For example, the secure gateway 230 may employ an IPSec protocol suite for authenticated and encrypted communication with and between components of the trusted platform 206. In another example, the user device 204a, 204b, 204c may employ encrypted communication over several protocols such as https, to communicate with all components of the trusted platform 206. Moreover, different respective secure communication protocols may be used between different components of the trusted platform 206 without limitation. For example, communication with a partner 232 through a secure gateway 230 may be by way of an IPSec protocol, whereas communication between a user's device 204a, 204b, 204c and the user's secure user profile 212 may employ strict certificate TLS authentication to facilitate communication.

The trusted platform 206 also includes a ledger 210 that may be used to record transactions within the trusted platform 206. For example, each request for access to user data may be recorded in the ledger 210. Moreover, any manifesting of user data or denials for manifesting user data may be recorded in the ledger 210. Further still, the ledger 210 may be used to record access permission parameters that a user may apply to data at varying levels of granularity and detail as described below. In this regard, the ledger 210 may be used to provide an auditable record for every transaction processed by the trusted platform 206. The ledger 210 may be secured by any appropriate means to reduce or eliminate inappropriate tampering with the ledger 210. As an example, the ledger 210 may employ a blockchain-based distributed ledger that secures the recorded transactions within the ledger 210 using blockchain techniques. In this regard, and as described in greater detail below, the secure platform 206 may comprise a distributed, cloud computing architecture. As such, each instance of the trusted platform 206 may have an instance of the ledger 210. Also, the ledger 210 may be replicated or distributed amongst a number of nodes such as at a user device 204, within a secure user profile 212, or at another node. Distribution of the ledger 210 may facilitate fault tolerance (e.g., using security advantages associated with distributed ledger technologies within blockchain). In another example, the trusted platform 206 can also use external ledger technologies such as financial services ledgers to store transactions, such as any monetization by users of their data, at their discretion.

The trusted platform 206, which may be a distributed system may, in at least one example, be executed in a cloud computing environment. Specifically, individually provisioned cloud containers may be attributed to various components of the trusted platform 206. As an example, each secure user profile 212 may comprise a unique container executed in a cloud computing environment. Furthermore, the secure storage of a secure user profile 212 may comprise dedicated secure storage (e.g., object storage) that is unique for each secure user profile 212. Such partitioning of the secure user profile 212 may facilitate improved security and management of such storage by a user 202a. Moreover, the platform execution environment 260 may comprise one or more cloud computing components to facilitate execution of the trusted platform 206. Moreover, to the extent that components of the trusted platform 206 may be distributed in various cloud computing environments or components, any communication between components of the trusted platform 206 may utilize a secure communications protocol, including security gateways 230, as described above even through such security gateways 230 are not depicted in FIG. 2 between components within the trusted platform 206. In this regard, it may be appreciated that any execution environment or storage may be scalable by adding or removing cloud resources.

The distributed trusted platform 206 may include multiple instances of the trusted platform 206 or multiple instances of components of the trusted platform 206. The multiple instances of the trusted platform 206 or components thereof may coordinate to service users or may be isolated to provide private trusted platform instances 206 for a limited user group (e.g., an organization or other secure, private group). In this regard, groups of users 202 served by one or more instances of the trusted platform 206 may be referred to as a realm. Accordingly, multiple private and/or public realms may be defined. For example, trusted platform parameters within a given realm may be varied for a particular purposes (e.g., security protocols or the like).

The trusted platform 260 also includes an insight module 214. The insights module 214 may comprise anonymized user insights data based on user data from a plurality of secure user profiles 212. Specifically, users 202 may configure anonymized user data is used with the insights module 214. As will be described in greater detail below, user data may be provided at a number of different granularities or layers such that different user data may have different access permission parameters or allowances applied thereto. As such, a user 202 may define what user data to share with the insights module 214. Moreover, as all insights data may be managed within the trusted platform 206, upon a user electing to no longer provide access to user data for execution in the insights module 214, such an election may be enforced within the trusted platform 206 to conform to the user's defined data permission parameters (e.g., all or selected user data may be withdrawn from the anonymized data set or additional user data may be shared with the insights module 214).

Upon a user 202 opting into providing user data to the insights module 214, the access control manager 262 may facilitate access to the appropriate user profiles 212 using appropriate secure communications protocols. In addition, an anonymization protocol 216 may be applied to the user data to create a unique anonymized user insights data set based on the user data shared with the insights module 214. The anonymized insights data set may be stored at the insights module 214. That is, the insights data set may include a unique, separate data set comprising the anonymized data from the user profiles 212 as granted by corresponding users 202. In turn, partners 232 may access the insights module 214, and in particular the insights data set to provide analysis of the insights data. In particular, partners 232 may develop and deploy an insights kernel (e.g., through the kernel deployment engine 208) that may access the insights module 214. In this regard, partners 232 may access the insights data to perform insights analysis regarding user preferences associated with user demographic data or the like. Such insights analysis may be used to fine tune user experiences in partner programs deployed in the system or other partner offerings (e.g., real world advertising campaigns and the like).

Figure 3:
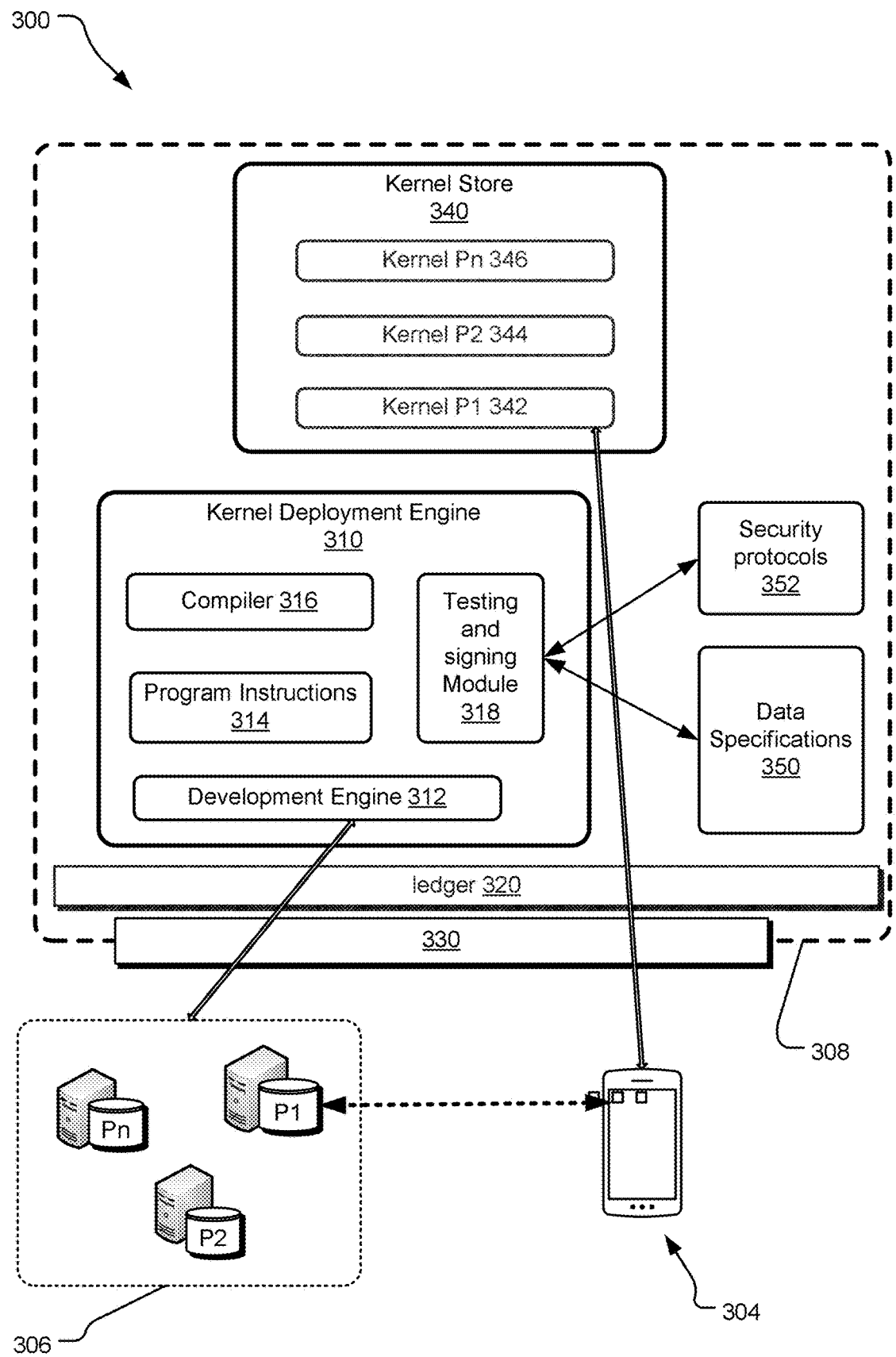
FIG. 3 illustrates an example of components of a kernel deployment engine including implemented on a trusted execution environment.

FIG. 3 illustrates an example of components of a kernel deployment engine 310 including implemented on a trusted execution environment 300. The kernel deployment engine 310 may be deployed on a trusted platform 308 that employs various security protocols to maintain and enhance security of user data, including providing a secure gateway 330. One or more partners 306 may use the kernel deployment engine 310 to develop and store signed application kernels. The kernel deployment engine 310 includes a development engine 312 that may be used by the partners 306 to generate application programs.

In one implementation, the development engine 312 may provide a secure integrated development environment (IDE) that can be used by the partners 306. The IDE may be used by the partners to enter program instructions 314 that will be used to generate application kernels for execution on the trusted platform 308. In one implementation, the IDE has its own coding language that is used by the partner 306 to develop the application program instructions 314. Alternatively, the IDE may provide an interface that allows partners to submit application program code in other coding languages, such as Java, etc., and to convert it to instructions that may be used by the kernel development engine 310.

The kernel deployment engine 310 may use various data specifications 350 that specifies data usage and control specification as provided by users 304 and the trusted platform 308. Specifically, the data specifications may include data access specifications, data control specifications, data storage specifications, data retention specification, data aggregation specifications, and data usage specifications. Specifically, the data specifications may be provided to the trusted platform in the form of metadata for various database and data tables using the storage data. Such data specification may be exposed to the kernel development engine through a firewall. In turn, the kernel development engine 310 may expose a copy of such data specifications to various partners 306 developing the application kernels.

An example of a data access specification may provide that only certain partners or users can access a particular data. As an example, a user may specify that bank account number may only be accessed by a redetermined financial institution. Similarly, a data control specification may specify that a particular data may only be communicated through a secured gateway provided by the trusted platform 308. On the other hand, a data storage specification may provide that a particular data may be stored only in the trusted platform 308 behind a firewall. On the other hand, an example of a data aggregation specification may provide that particular data about a user may not be used in generating any non-personally identifiable information (PII). Similarly, data usage specifications may provide that particular user data may only be shared with certain other users. For example, a user may specify that purchase history data is only shared with a spouse whereas location information is shared with only immediate family members.

The kernel development engine 310 may also include a testing and signing module 318 that evaluates the program instructions 314 to ensure that they are in compliance with the data specifications 350 and the security protocols 352. For example, if a program instruction using a particular user data is intended to communicate that particular user data to an entity outside of the trusted platform 308 when the data specifications 350 provide that that particular data cannot be communicated to a third party, the testing and signing module 318 invalidates that program instruction and notifies the partner 306 that provided such program instruction. Once all the program instructions are verified to be in compliance with the data specifications 350 and the security control protocols 352, the testing and signing module 318 certifies them and makes them available to a compiler 316.

The compiler 316 may ingest the program instructions 314 and generate executable application kernels that can be executable on the trusted platform 308. In one implementation, the output of the compiler 316 is also made available to the testing and signing module 318 for further certification. the testing and signing module 318 tests the compiled and executable application kernels in a test environment to ensure that they are in compliance. For example, the testing and signing module 318 may execute the compiled and executable application kernels using test data and monitor the execution and the output to verify compliance. Once the compiled and executable application kernels are verified by the testing and signing module 318, the testing and signing module 318 generates a signed application kernel that is stored on a kernel store 340. As illustrated, the kernel store 340 includes signed application kernels 342-346 for various partners.

Once a signed application kernel is deployed in the kernel store 340, the kernel store 340 notifies the partners 306 and the users 304 that the signed application kernel is available for use. For example, if the signed application kernel P1 342 is deployed on behalf of a partner 306 P1, the partner P1 may initiate its use and notify its users to download a local client on their devices. Thus, the partner P1 may notify the user 304 to download a local client on the user's device for communication with the signed application kernel P1 324 on the kernel store 340. Furthermore, once a signed application kernel is deployed on the kernel store 340, the trusted platform 308 may make available the secure gateway 330 for communication between the signed application kernel and the local clients on user devices.

The kernel deployment engine 310 may also track the usage and execution of the signed application kernels 342-346 and record the access activity in a ledger 320. Furthermore, the kernel deployment engine 310 makes periodic execution data about the signed application kernels 340 to the testing and signing module 318 so as to evaluate continued compliance of the signed application kernels 342-346 with the data specifications 350 and security protocols 352.

Figure 4:
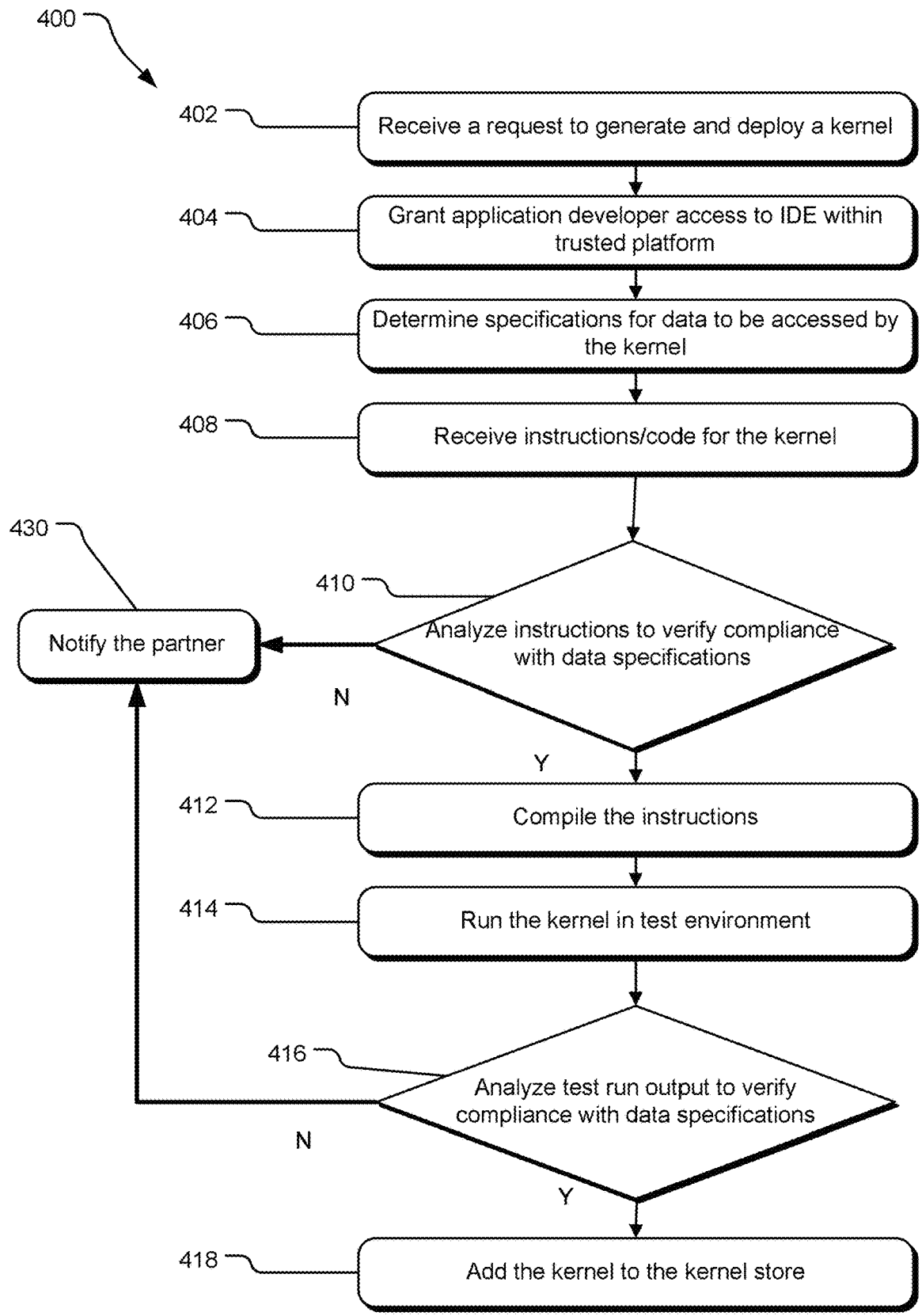
FIG. 4 illustrates an example operations for deploying a partner application on a trusted partner application deployment platform's kernel store.

FIG. 4 illustrates an example operations 400 for deploying a partner application on a trusted partner application deployment platform's kernel store. Specifically, the operations 400 may be implemented on the kernel deployment engine 310 disclosed above in FIG. 3. In one implementation, one or more of the operations 400 may be stored on a computer readable medium, such as the memory 24, 25 disclosed below in FIG. 9 and be executable on a processor such as a processing unit 21 disclosed therein. An operation 402 receives a request to generate an application kernel on a kernel store. For example, a partner providing applications for social networking may send a request to generate an application kernel for execution on a trusted platform. Upon receiving the request, an operation 404 grants the application developer or provider access to an IDE within the kernel deployment engine 310 so that the application developer can provide or generate the application programming code.

An operation 406 determines the specifications for the data to be accessed by the application developer generating the application kernel. Such specifications may be provided with the database or data schemas related to the user profiles. Thus, if the application provider is developing an application that is going to access personal data for travel purposes, the operation 406 determines data specification for all data that is relevant to be and will be potentially used by the application data provider for using the personal data for travel purposes. The operation 406 may also evaluate various data communication protocols that will be applicable to the application being developed.

An operation 410 receives program instructions for the application kernel. Such instructions may be using a specific programming language used by an IDE of the trusted platform. Alternatively, the application provider may upload instructions I a file, such as a text file having C++ instructions that are converted, as necessary, into the language used by the IDE. Subsequently, an operation 410 analyzes the instructions to verify their compliance with the data specifications and the communication protocols. If it is determined that the instructions are in compliance with the data specifications and the communication protocols, an operation 412 compiles the instructions to generate executable version of the application kernel.

The compiled application kernel is run in a test environment at an operation 414. The output generated by the test run is evaluated by an operation 416 again to ensure the compliance of the application execution and output with the data specifications and the communication protocols. If the compliance is verified, the application kernel is added to a kernel store. If either of operations 410 and 416 determines that at least some of the instructions or execution output are not in compliance with the data specifications and the communication protocols, an operation 430 notifies the application developer of the non-compliance with appropriate instructions for re-submission of the application program instructions.

Figure 5:
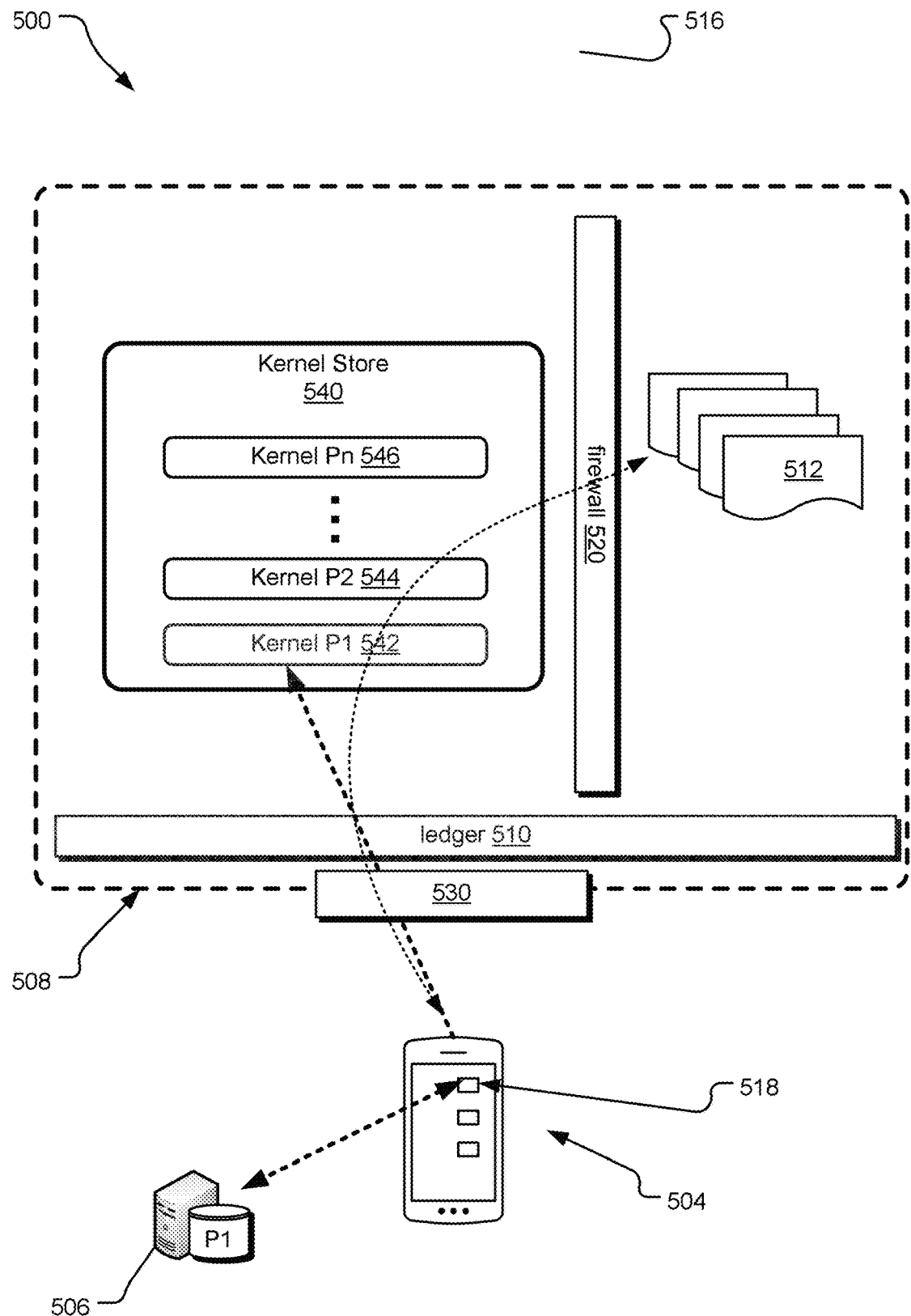
FIG. 5 illustrates example of components of a kernel store of the trusted partner application deployment platform working with user devices.

FIG. 5 illustrates example of components 500 of a kernel store 540 of the trusted partner application deployment platform working with user devices such as a user device 504. Specifically, the kernel store 540 is illustrated to include various signed applications kernels 542-546 that are verified to execute on a trusted platform 508 such that they comply with all data specifications for the user data 512 and with communication protocols of the trusted platform 508. The trusted platform 508 provides a security gateway 530 for communication between each of the signed application kernels 542-546 and a trusted partner client application 518 running on the client device 506. Various implementations of security gateway 530 are disclosed in further detail below in FIGS. 11-17.

In one implementation, a partner 506 that generated the signed application kernel communicating with the client device 504 may facilitate implementation of the client device 504's access to the signed application kernel via the secure gateway 530.

The trusted platform 508 also monitors the communication between the signed application kernels 542-546 and the client device 504 in a ledger 510 that may be evaluated to ensure the continued compliance of the signed application kernels' execution. The trusted platform 508 also allows the client device 504 to access user profiles 512 using the appropriate signed application kernel through an internal firewall 520.

Figure 6:
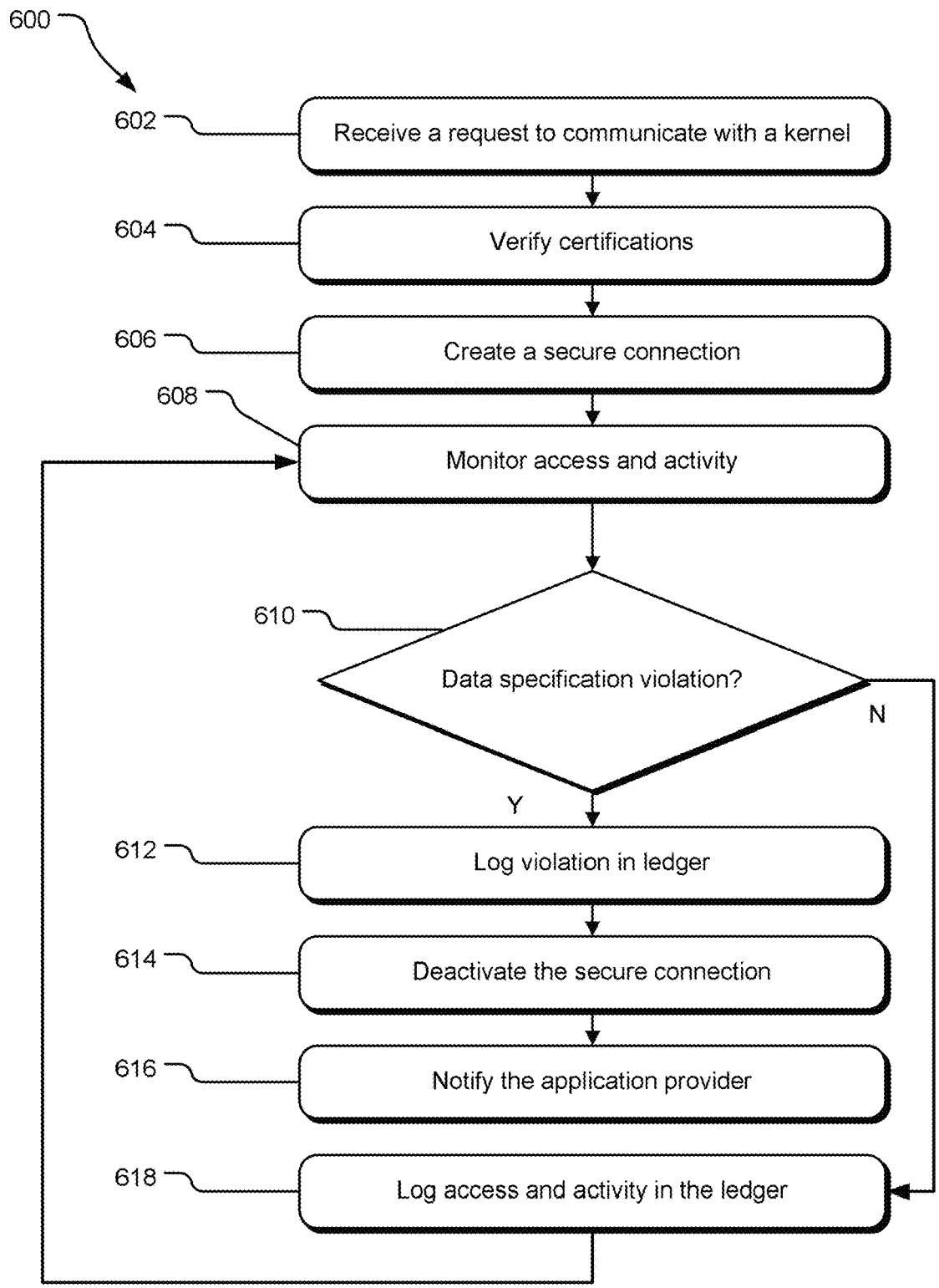
FIG. 6 illustrates example operations for monitoring execution of trusted application kernels and user devices.

FIG. 6 illustrates example operations 600 for monitoring execution of trusted application kernels and user devices. An operation 602 receives a request from a client device for communicating with a signed application kernel. In response, an operation 604 verifies certifications of the signed application kernel an upon successful verification, an operation 606 creates a secure connection between the client device and the signed application kernel via a security gateway of the trusted platform hosting the signed application kernel.

As the client device communicates with the signed application kernel, an operation 608 monitors the access and activity of the signed application kernel. The output of the operation 608 is input to a determining operation 610 to determine if there has been any violation of data specifications or communication policies of the trusted platform. In response to any violation, an operation 612 logs the violation in the ledger and an operation 614 terminates the access of the client device with the signed application kernel. Subsequently, an operation 616 notifies the application developer of the violation with instructions for revisions thereto. If there is no violation, an operation 618 logs the access and activity of the signed application kernel into a ledger and continues with further monitoring of the signed application kernel activity.

Figure 7:
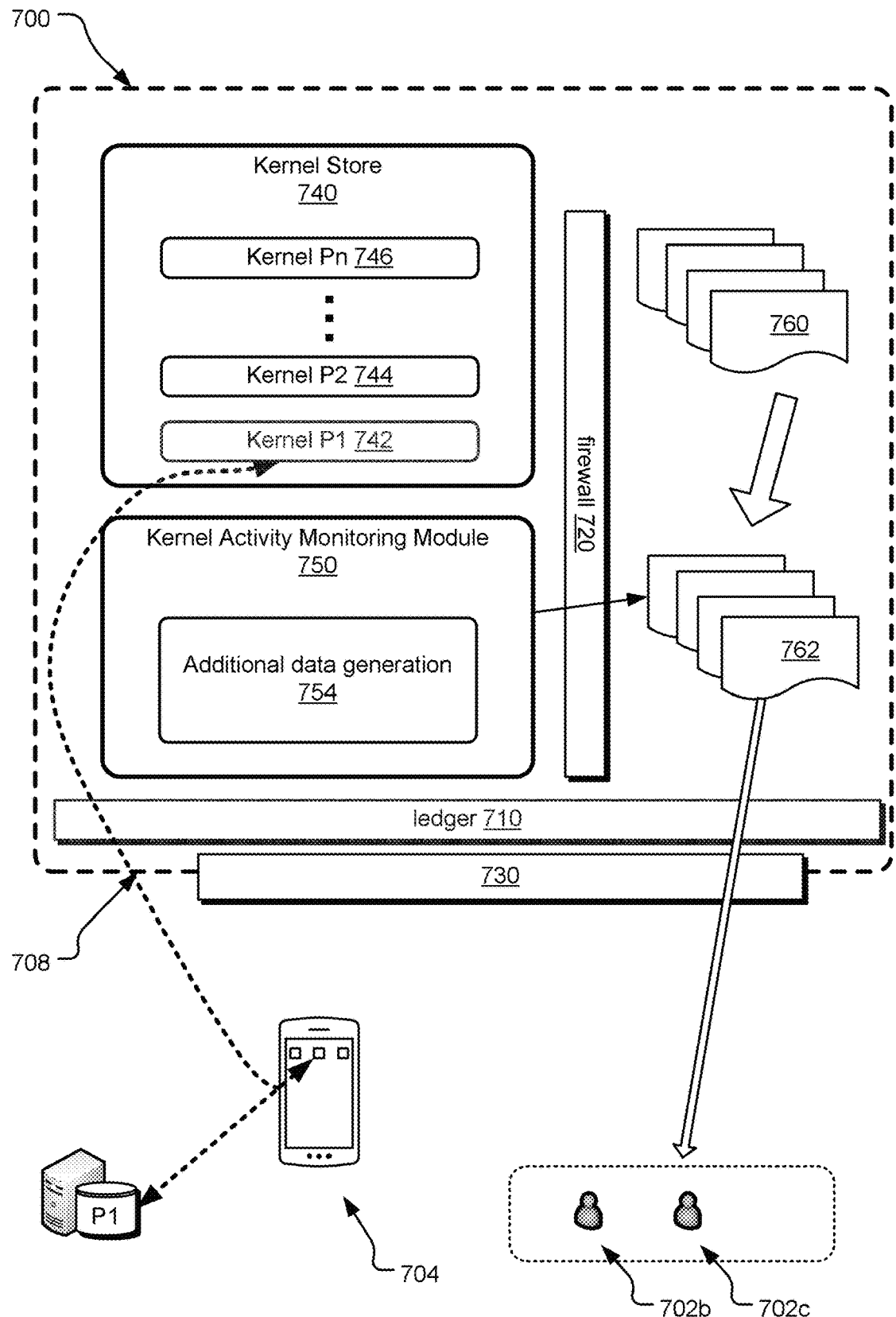
FIG. 7 illustrates example components of a kernel store of the trusted partner application deployment platform working with user profiles and insights.

FIG. 7 illustrates example components 700 of a kernel store 740 of a trusted partner application deployment platform working with user profiles and insights. Specifically, the kernel store 740 may store various signed application kernels 742-746 that are generated and certified using a kernel deployment engine such as the kernel deployment engine 310 disclosed in FIG. 3. The activities of the signed application kernels 742-746 may be monitored by a kernel activity monitoring module 750. In one implementation, kernel activity monitoring module 750 monitors the activities of signed application kernels 742-746 for both continued compliance with various user data specifications and for generating additional data based on the activity.

For example, an additional data generation module 754 analyzes the collected data, such as the number of accesses to the signed application kernels 742-746, the amount of data communicated between a client device 704 and the signed application kernels 742-746, the type of data communicated between a client device 704 and the signed application kernels 742-746, etc., and generates additional and/or aggregate data based on collected data. An example of an additional data may be how often a user has dined at a seafood restaurant in a given time period.

The newly generated additional data 762 may be stored at additions to user profiles 760 about various users. Subsequently, based on the user data specifications related to the user profiles 760, the additional data 762 may be stored with other users 702. For example, of the user profile specifies that any additional data may be shared with friends, family, etc. IN the case of additional data related to frequency of dining at a seafood restaurant, sharing such newly generated data with the family and friends allows them to better understand the tastes of the user. All communications between the other users 702 is made using secured gateway 730 and is recorded in a ledger 710.

Figure 8:
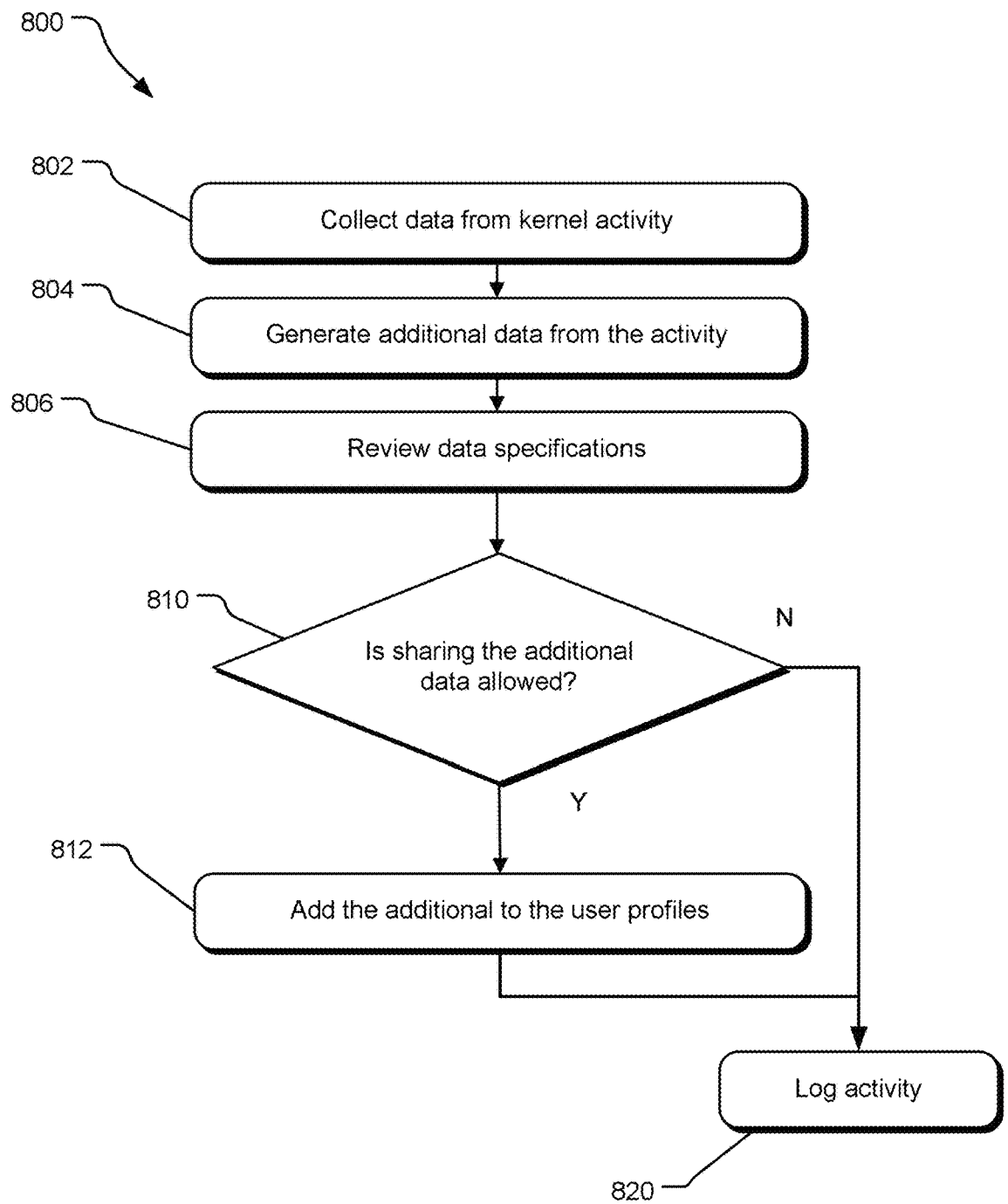
FIG. 8 illustrates operations for collecting data from execution of trusted application kernels.

FIG. 8 illustrates operations 800 for collecting data from execution of trusted application kernels. An operation 802 collects various data from activity of signed application kernels. For example, if a signed application kernel for a dining application has certain interactions with a user device, various data about the activity is collected. An operation 804 generates additional data from the data collected regarding various users at operation 802. An operation 806 reviews the data specifications regarding the various data collected and generated at operations 802 and 804.

For example, if any location data of the users is collected, the operation 806n reviews the data specifications related to use of direct or generated location data for the user. Using the data specifications, an operation 810 determines if sharing of any collected or generated data is allowed. If so, an operation 812 adds the newly generated data to the user profiles. Subsequently, an operation 820 logs all the activity related to generation and sharing of the data.

Figure 9:
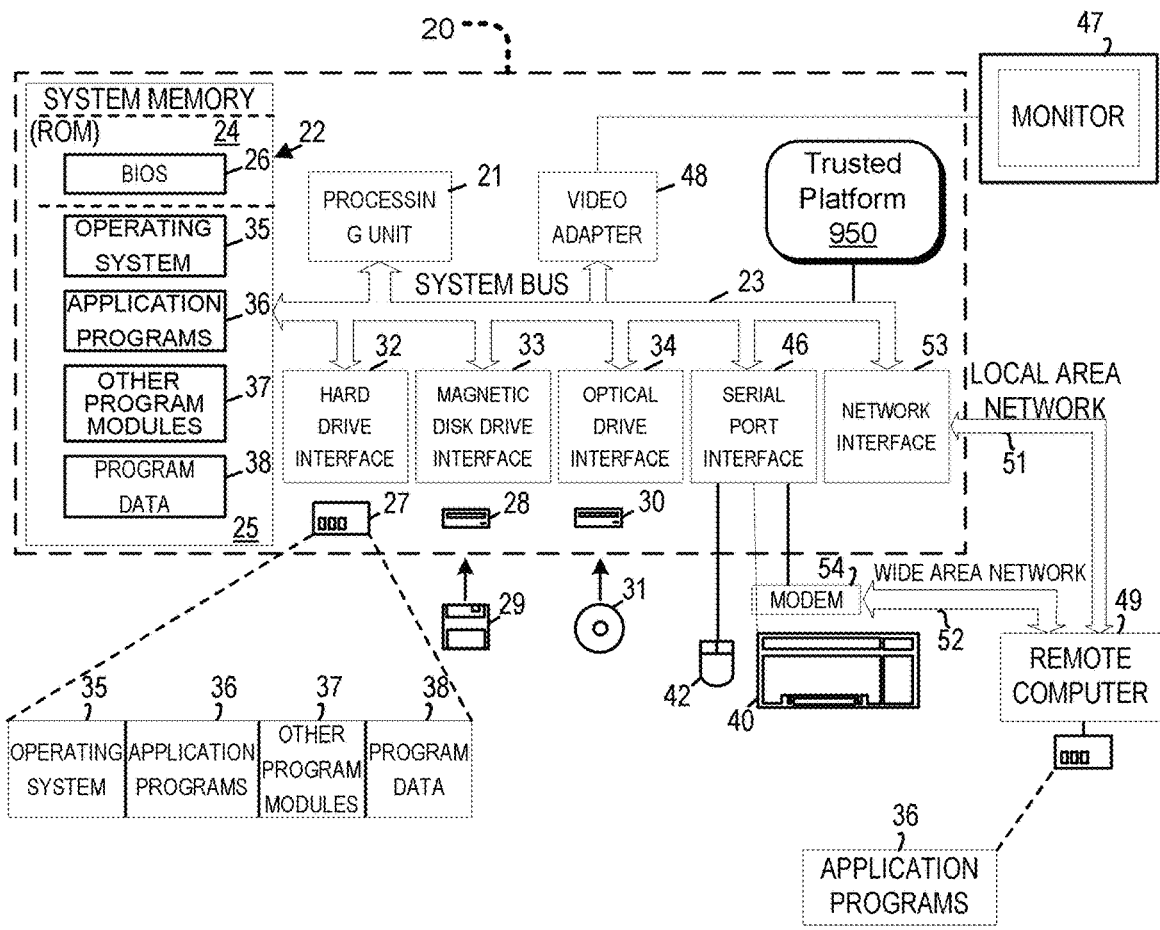
FIG. 9 illustrates an example of a processing device suited for execution of certain aspects of the present disclosure.

FIG. 9 illustrates an example 900 that may be useful in implementing the multi-modality video recognition system disclosed herein. The example hardware and operating environment of FIG. 9 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, a trusted platform 950 may be implemented on the computer 20 as an application program 36 (alternatively, the trusted platform 950 may be implemented on a server or in a cloud environment). The trusted platform 950 may utilize one of more of the processing unit 21, the memory 22, the system bus 23, and other components of the personal computer 20.

Figure 10:
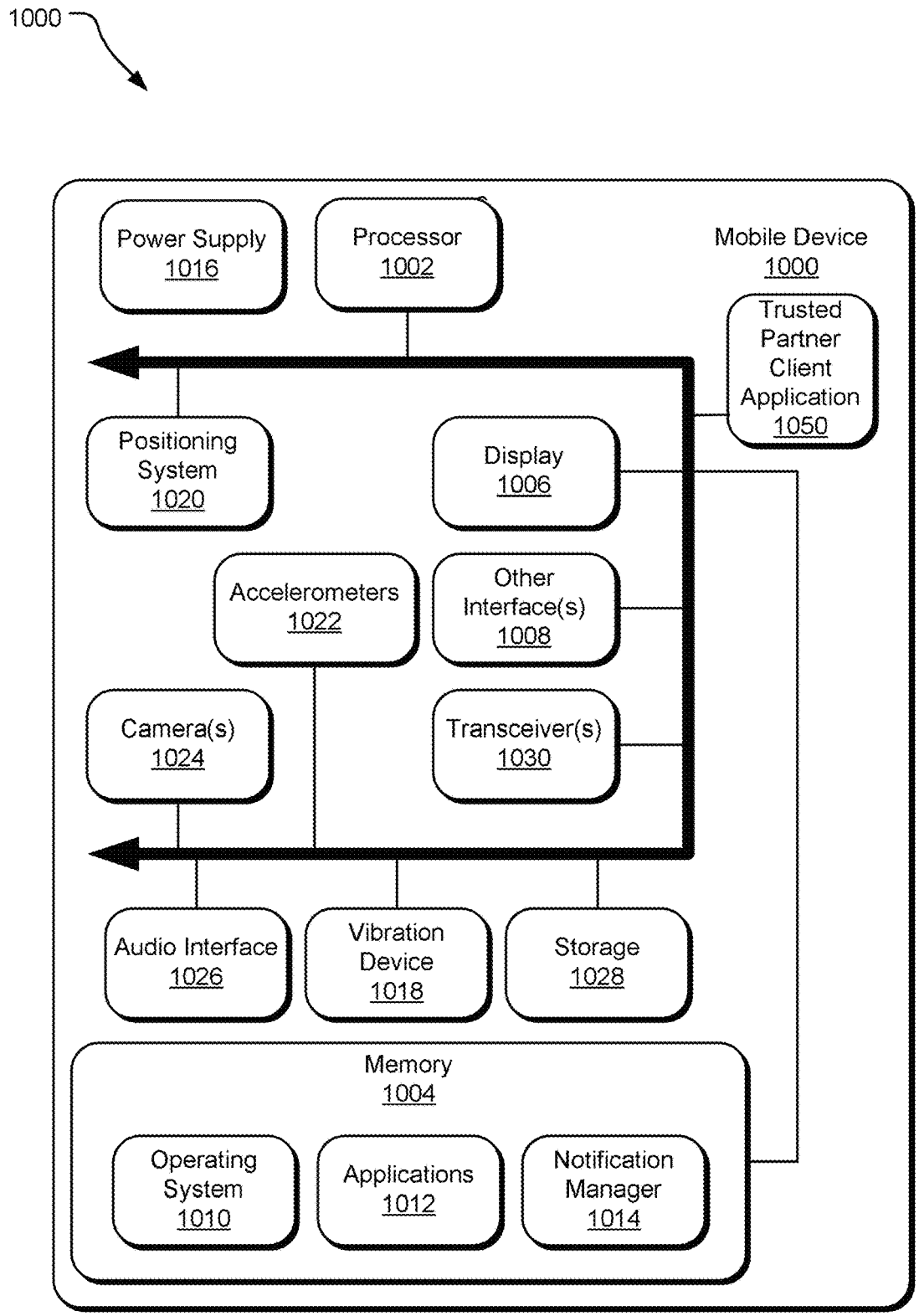
FIG. 10 illustrates an example mobile device suited for execution of certain aspects of the present disclosure.

FIG. 10 illustrates an example schematic of a processing system 1000 suitable for implementing aspects of the disclosed technology including a trusted platform. The processing system 1000 includes one or more processor unit(s) 1002, memory 1004, a display 1006, and other interfaces 1008 (e.g., buttons). The memory 1004 generally includes both volatile memory (e.g., RAM) and non-volatile memory (e.g., flash memory). An operating system 1010 resides in the memory 1104 and is executed by the processor unit(s) 1002.

One or more applications 1012 are loaded in the memory 1004 and executed on the operating system 1010 by the processor unit(s) 1002. Applications 1012 may receive input from various input local devices such as a microphone, input accessory (e.g., keypad, mouse, stylus, touchpad, gamepad, racing wheel, joystick). Additionally, the applications 1012 may receive input from one or more remote devices such as remotely-located smart devices by communicating with such devices over a wired or wireless network using more communication transceivers 1030 and an antenna to provide network connectivity (e.g., a mobile phone network, Wi-Fi®, Bluetooth®). The processing device 1000 may also include various other components, such as a positioning system (e.g., a global positioning satellite transceiver) 1020, one or more accelerometers 1022, one or more cameras 1024, an audio interface 1026 (e.g., including a microphone, an audio amplifier and speaker and/or audio jack), and storage devices 1028. Other configurations may also be employed.

The processing system 1000 further includes a power supply 1016, which is powered by one or more batteries or other power sources and which provides power to other components of the processing system 1000. The power supply 1016 may also be connected to an external power source (not shown) that overrides or recharges the built-in batteries or other power sources.

In an example implementation, a trusted platform may include hardware and/or software embodied by instructions stored in the memory 1004 and/or the storage devices 1028 and processed by the processor unit(s) 1002. The memory 1004 may be the memory of a host device or of an accessory that couples to the host. A trusted partner client app 1050 may be implemented on the processing system 1000 for implementing one or more implementations of the deployment and communications gateway for deployment, trusted execution, and secure communications system disclosed herein. Specifically, the trusted partner client app 1050 may communicate with one or more signed application kernels such as those disclosed above via a security gateway, such as those discussed below in FIGS. 11-17.

The processing system 1000 may include a variety of tangible processor-readable storage media and intangible processor-readable communication signals. Tangible processor-readable storage can be embodied by any available media that can be accessed by the processing system 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1000.

Figure 11:
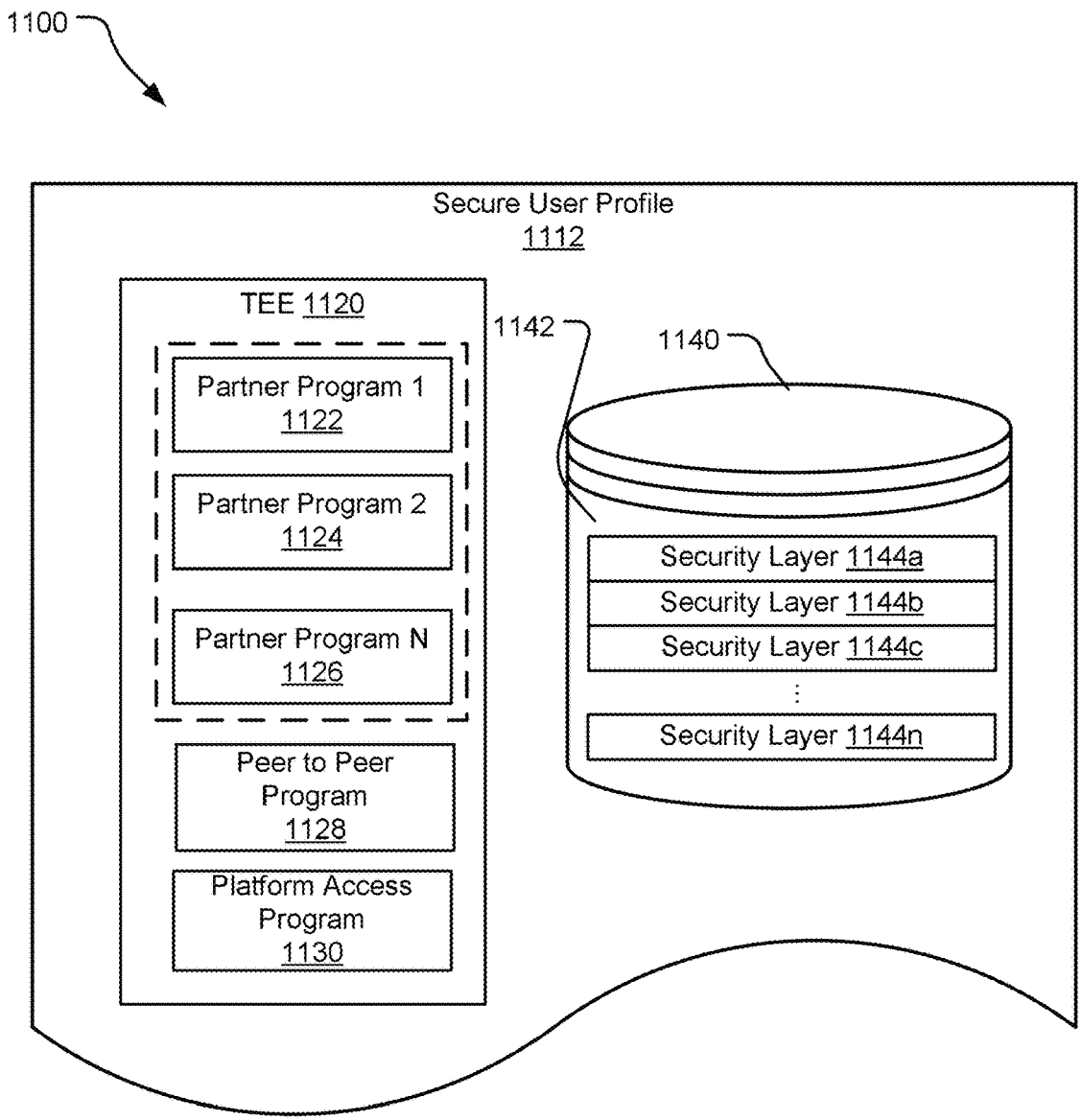
FIG. 11 illustrates an example of a secure user profile including secure storage and a trusted execution environment.

With further reference to FIG. 11, one example of a secure user profile 1112 is illustrated schematically. The secure user profile 1112 may include a TEE 1120 and secure storage 1140. As described above, the TEE 1120 of the secure user profile 1112 may be an execution environment deployed in a cloud computing environment. Specifically, each secure user profile 1112 may have a uniquely provisioned TEE 1120. In any regard, the TEE 1120 may include one or more programs (e.g., kernels) deployed to the secure user profile 1112 from a kernel store 234 of the trusted computing platform 206. In this regard, the TEE 1120 may include N partner programs including in the example depicted in FIG. 11 partner program 1 1122, partner program 2 1124, and partner program N 1126, with N being any appropriate number of partner programs deployed to the secure user profile 1112 from the kernel store 234. Accordingly, the partner programs 1122, 1124, and 1126 may comprise tested and certified programs or kernels that may be deployed into the TEE 1120 for execution at the direction of the user to access user data in the secure storage 1140. Deployment of partner programs 1124 to the TEE 1120 may be controlled by the user.

The TEE 1120 may also include a peer to peer program 1128 corresponding to the peer to peer manager 264 that may interact with a peer to peer manager executing in the platform execution environment 260 described above in relation to FIG. 2. The TEE 1120 may also include an access control program 1130 that may interact with an access control manager executing in the platform execution environment described above in relation to FIG. 2.

A program in the TEE 1120 (e.g., the peer to peer program 1128 or the access control program 1130) may comprise related kernels to a program executing in the platform execution environment 260. When a program is deployed to the TEE 1120 of the secure user profile 1112, access permission parameters may be loaded into the programs at the TEE 1120 to allow the programs to handle requests for access to user data at the TEE 1120 without having to communicate with the platform execution environment 260. In addition, further programs (e.g., mini-kernels) may also be deployed to a user device 204, which may allow processing of a request to user data to occur at the user device 204 (e.g., to facilitate offline processing or the like). If any one of the programs cannot process a request (e.g., due to missing access permission parameters needed to process the request or the like), the program may communicate upstream (i.e., in a network direction towards the platform execution environment 260) to process a request. For instance, a mini-kernel on a device 204 may communicate with either a corresponding program in the TEE 1120 of the secure user profile 1112 or a corresponding program in the platform execution environment 260 to process a request. As an example, if a user has not previously authorized or denied access as requested, a program of the TEE 1120 may communicate to a corresponding program in the platform execution environment 260 to provide a notice to a user to provide appropriate access permission parameters for the request. Once established, such access permission parameters may be pushed to the program in the TEE 1120 or to a program on a user device 204 to facilitate processing of like requests in the future. Moreover, access permission parameters may be different for different devices 204 or for different programs in the TEE 1120. For example, a user may have a work device 204b and a personal device 204c. The user may establish different programs and/or access permission parameters for each device such that request for data processed by each device may be handled differently to provide different access levels when using the respective devices. At each subsequent level away from the platform execution environment 260, each program instance deployed may be a more limited version of the program, thus offering fewer features or less robust processing. While this may allow for processing of some requests in a more efficient manner, it may still be useful to propagate a request to the TEE 1120 or platform execution environment 260 to employ the expanded capability of the programs at these instances.

The secure storage 1140 of the secure user profile 1112 may include a multi-layered data structure 1142 comprising a plurality of security layers 1144a-1144n. The security layers 1144a-1144n may correspond to different respective access permission parameters for each layer that may, at least in part, be used to determine whether a request for access to user data of a given security layer 1144. For example, respective portions of user data may be allocated to a given security layer 1144 and assigned appropriate access permission parameters. As an example, user data related to a user's finance may be allocated to security layer 1144a. Security layer 1144a may be assigned access permission parameters that limits access to this data to specific partners, service providers, or other peer users for certain uses. Furthermore, a user's health data may be allocated to security layer 1144b. Security layer 1144b may be assigned access permission parameters that limits access to this data to specific partners, service providers, or other peer users for certain uses. In this example, a user may wish to share first data from a first security layer in a first manner and second data from a second security layer in a second manner. Data may be provided at more than one security layer and/or different granularity of data may be provided at each layer. For example, user health data regarding the identity of a user's health providers may be provided a security layer 1144c. In contrast, user health data regarding user health information comprising protected health information such as test results, chart notes, etc., may be provided at security layer 1144b. A user may share the health data in layer 1144c differently than the data in security layer 1144b. In any regard, a user may allocate and/or assign any data at any granularity to any respective security layer 1144. Moreover, access permission parameters may be assigned to each respective security layer 1144. In this regard, a user may have controlled configuration of the access to the user data stored in the secure storage 1140.

In this regard, requests for user data may be processed by one or more programs in the TEE 1120 of the secure user profile 1112 and/or a platform execution environment to determine whether the request for access to the user data can be granted. While requests from different entities may be processed differently as described in greater detail below, each request may at least identify requested user data, a user identify for the requested user data, and a requesting entity. These request parameters may be received at the trusted computing platform 206. Access permission parameters corresponding to the request parameters may be retrieved to determine whether the request for access to the requested data is accessible in view of the access permission parameters. In this regard, all requests for user data may be processed by the trusted platform 206 to allow a user control over who gains access to what user data for what purpose for the user as will be appreciated in greater detail with the following discussion regarding specific requests received from a service provider, a partner, and a peer user, respectively.

Figure 12:
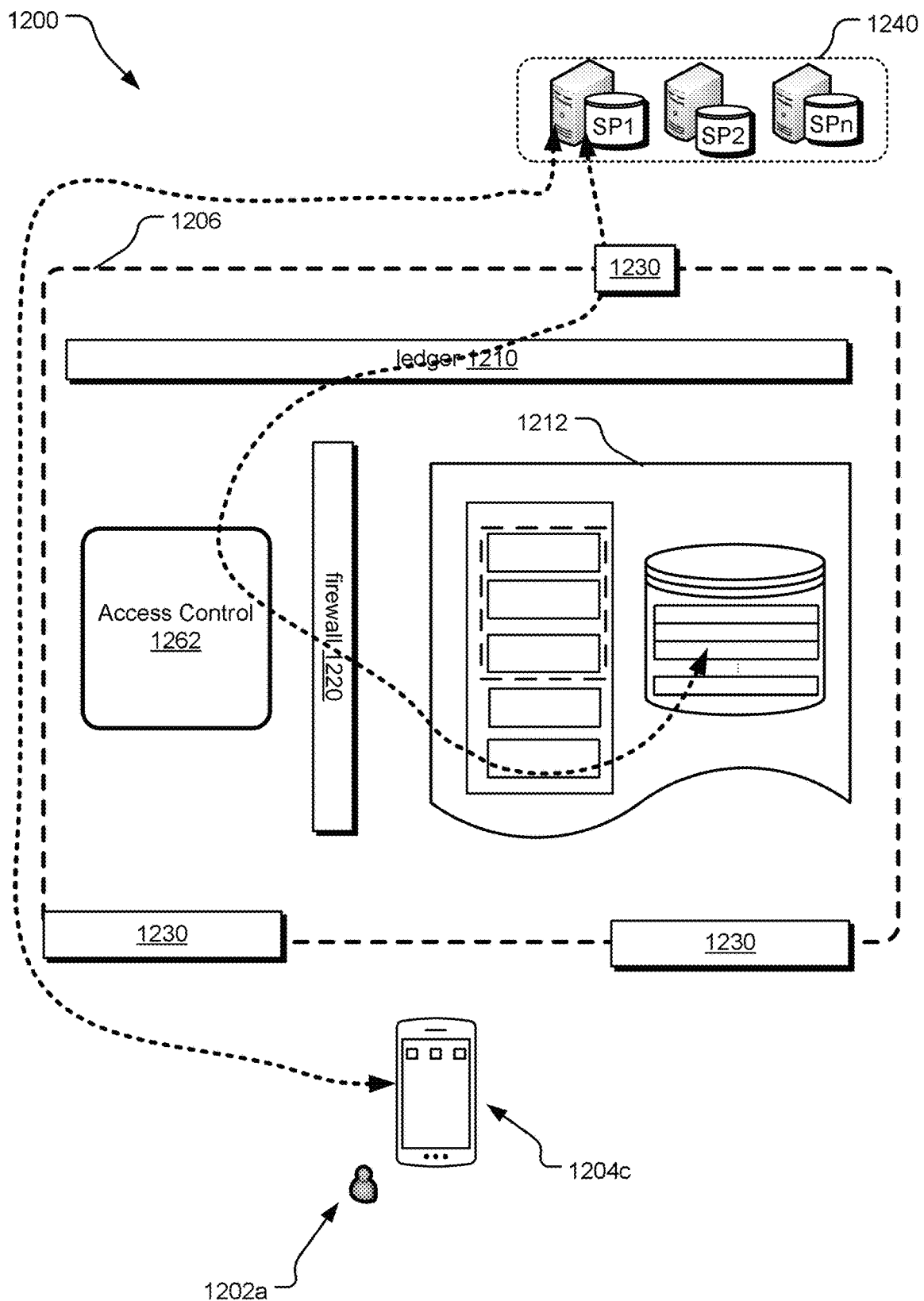
FIG. 12 illustrates an example of components of a trusted platform involved in processing a request for access to user data from a service provider.

FIG. 12 illustrates an example of a trusted platform 1206 shown only with participating components in the processing of requests from service providers 1240 for purposes of clarity. A user 1202a may use a user device 1204c to connect to a service provider 1240. For example, a user 1202a may navigate to a service provider website or may execute a service provider application on the user device 1204c. In any regard, communication between the user device 1204c and the service provider 1240 may be established. The service provider 1240 may seek user data for any of a number of purposed including, for example, the purpose of providing a service to the user 1202a such as provision of data in response to the user data, customization of information presented to the user 1202a, or for any other of a plurality of potential reasons that the service provider 1240 seeks the user data. In response, a user 1202a may direct the service provider to the trusted platform 1206 to request the requested user data from the secure user profile 1212 for the user 1202a (e.g., rather than providing the user data directly).

In turn, the service provider 1240 may establish communication with the trusted platform 1206 by way of a security gateway 1230. Specifically, a request from the service provider 1240 may be provided to an access control module 1262. In addition, the request may be recorded in a ledger 1210. The access control program 1262 may identify from the request the requested user data, a user identity of the user for the requested user data, and a requesting entity (e.g., the service provider 1240). Based on one or more of these request parameters, the access control module 1262 may retrieve the appropriate access permission parameters and determine, based on a comparison of the request and the access permission parameters, whether to grant access to the request to access the requested user data. For example, the requested data may be identified in a security layer 1144 of the multi-layered data structure 1142. The access permission parameters for the requested data based on the security layer to which the requested data belongs may be compared to the request. If the access permission parameters indicate the user has provided access in the nature of that requested, the requested data may be retrieved from the secure user identity 1212 by securely accessing the secure user identity 1212 through the firewall 1220. The requested data may then be provided to the service provider 1240 in response to the request. The provision of the requested data to the service provider 1240 may be recorded in the ledger 1210.

Figure 13:
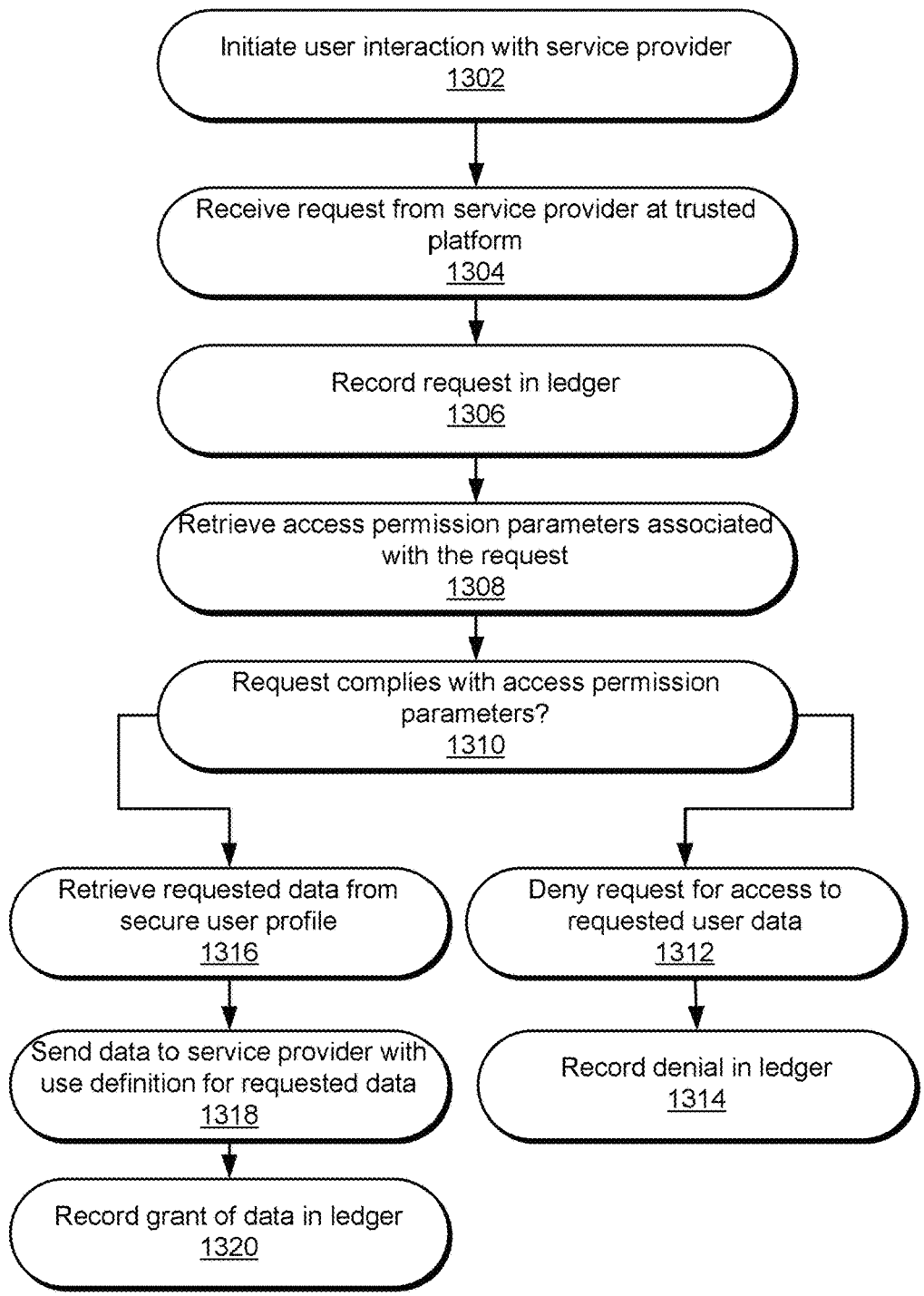
FIG. 13 illustrates example operations for processing a request for access to user data from a service provider.

With further reference to FIG. 13, example operations 1300 for processing a request from a service provider are illustrated. The operations 1300 may commence with an initiating operation 1302 in which a user initiates interaction with a service provider. As may be appreciated from the foregoing description, the initiating operation 1302 may include the service provider requesting user data from the user (e.g., in connection with provision of a service or the like). In turn, a receiving operation 1302 includes receiving a request from the service provider at the trusted platform. A recording operation 1306 records the request from the service provider in a ledger.

In turn, the access permission parameters for the requested data may be retrieved. A retrieving operation 1308 retrieves access permission parameters associated with the request. For example, the requested user data may be identified from the request. Such requested user data may be located in a multi-layered data structure. The user identity secure storage having a plurality of security layers allows for data to be grouped and metadata tagged based on type, sensitivity, or any other user-definable parameters. For example, a user may apportion user data to a given security layer at any granularity of the data. This may allow a user to control the user data to whatever extent the user wishes by attributing access permission parameters to any number of security layers into which data has been apportioned. As such, the identification of the data may include use of metadata tags for the data. For example, metadata tags may be attributed to user data that define association of the user data to a security layer or to an access permission parameters. In turn, metadata tags for the requested data from the request may be identified and corresponding metadata tags may be used to identify the requested data in a secure user profile such that access permission may be analyzed in relation to the request (e.g., including the request parameters included in the request such as the requesting party, the nature of the requested data, the indicated use of the user data, etc.) in a determining operation 1310 in which it is determined whether the request corresponds to allowed access to the user data based on the access permission parameters.

If the determining operation 1310 determines that the request is not allowed in view of the access permission parameters, a denying operation 1312 may refuse the request for access to the requested user data. In addition, the refusal may be recorded in an recording operation 1314 in which the refusal is documented in a ledger. In contrast, if the request is allowable in view of the relevant access permission parameters for the request, a retrieving operation 1316 may retrieve the requested user data from the secure user profile. A sending operation 1318 may include sending the requested user data that is retrieved from the secure user profile to the service provider requesting the user data. Of note, the service provider may be provided with only the requested data from the request such that other user data from the secure user profile not requested is not provided or otherwise accessible by the service provider. In addition, the sending operation 1318 may include providing a limitation on the use of the requested data. The limitation on the use of the requested data may be the same as an indicated use from a request. Alternatively, if a request has no such indicated use, the sending operation 1318 may include generating a permissible use of the user data that is communicated with the requested data in the sending operation 1318. In addition, the grant of access may be recorded in a ledger in a recording operation 1320. This recording may include recording any limitation on use of the data provided in the sending operation 1318. As such, an auditable record may be established if the service provider were to utilize the requested user data in a manner not authorized by the limitation on use of the requested user data.

Figure 14:
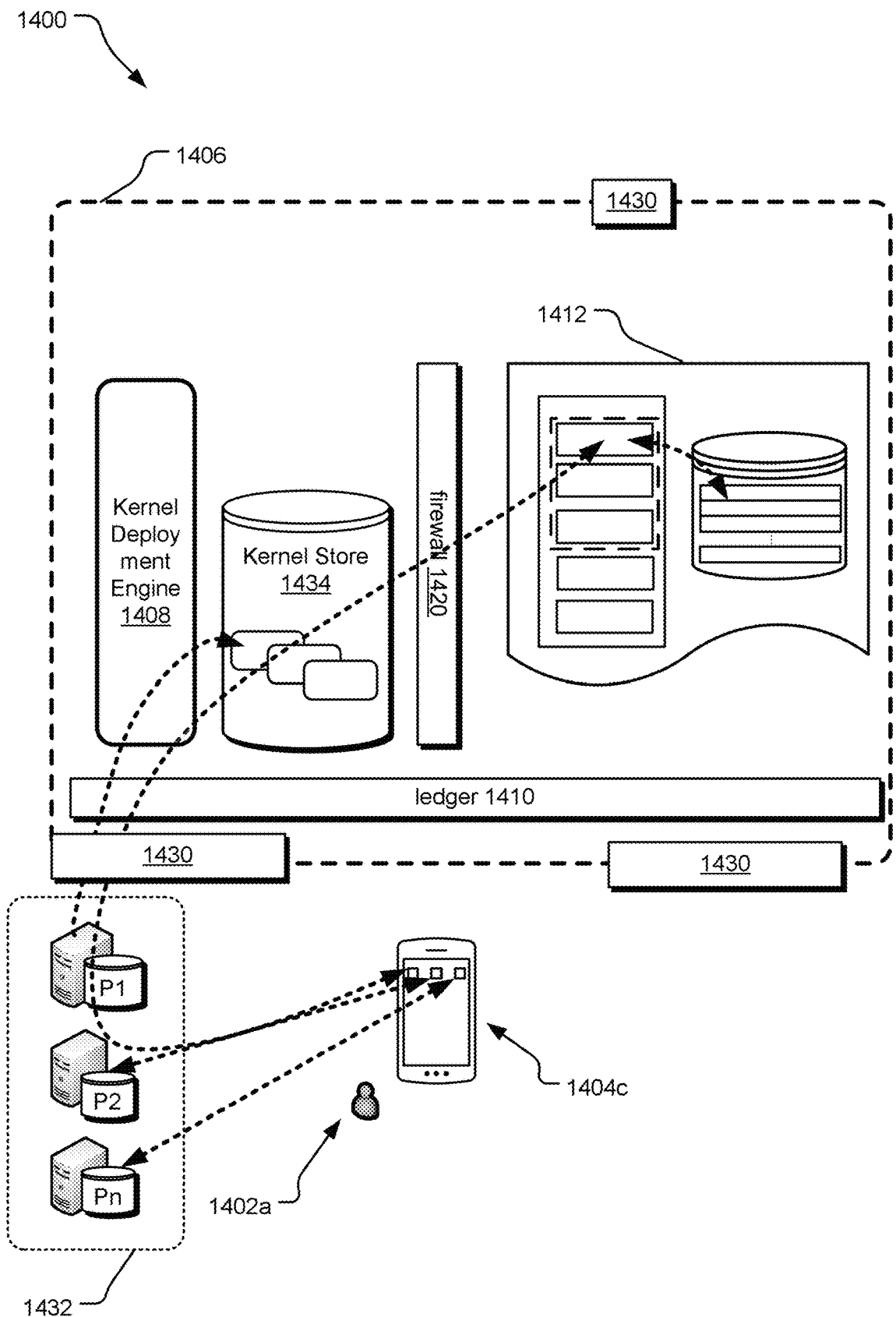
FIG. 14 illustrates an example of components of a trusted platform involved in processing a request for access to user data from a partner entity to the trusted platform.

FIG. 14 illustrates an example of a trusted platform 1406 shown only with participating components in the processing of requests from partners 1432 for purposes of clarity. As briefly described above, partners 1432 in the trusted platform 1406 may provide programs for execution in the trusted platform 1406. As such, partners 1432 may provide programs to the kernel deployment engine 1408, which may test and certify the program to ensure the program performs in the manner described by the partner to ensure that any user data accessed by the program is treated in a manner that is expected without data siphoning, surreptitious data sharing, or other disposition of user data that a user may not be aware of otherwise. Once tested and certified, the partner program may be provided in a kernel store 1434. A user 1402*a* may then access the trusted platform 1406 and choose to deploy the partner program into the user's secure user profile 1412. That is, the partner program may be executed in a TEE of the secure user profile 1412 behind a firewall 1420. In turn, when the partner program executes in a manner that requires access to user data, the request may be issued from the TEE of the secure user profile for access to requested user data in the secure storage of the secure user profile. As described above in relation to service provider requests, a request from a partner program executing in the TEE of the secure user profile may be processed in the secure user profile 1412 to determine whether requested user data is authorized to share with the partner program. If, based on comparison of the request from the partner program to appropriate access permission parameters corresponding to the request, access is granted, the partner program may access the requested user data from the secure storage for use in execution of the partner program in the TEE of the secure user profile 1412.

In contrast to the service provider request described above, because a partner program executes in a secure user profile 1412, the user data need not be provided outside the secure user profile 1412 for the partner program to utilize the user data. That is, the user data may not be provided to the partner 1432, but rather used in the execution of the partner program in the TEE of the secure user profile 1412. Any data communicated to the partner 1432 may be according to disclosed data usage that has been tested and certified by the kernel deployment engine 1408. Moreover, if the user 1402*a* elects to revoke access to user data by the partner program, the partner program may be deleted from the TEE of the secure user profile 1412 such that the partner 1432 no longer has access to the user data. In this regard, the partner program allows a user to further control access to user data as user data need not be communicated to the partner 1432 as the partner program may be executed in the TEE of the secure profile 1412 with access to user data as defined by the access permission parameters without requiring the user data to be communicated remotely to the partner 1432.

Figure 15:
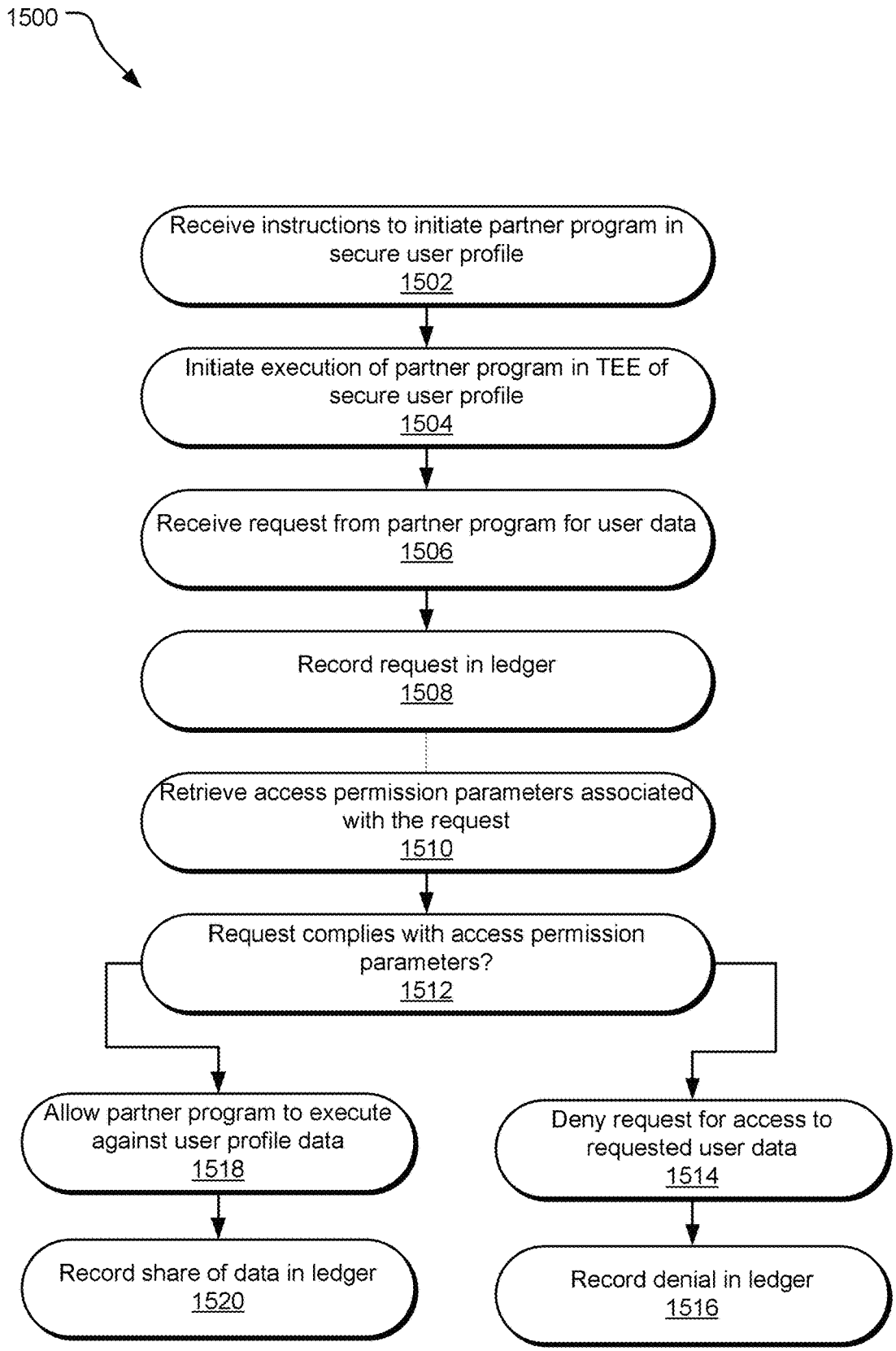
FIG. 15 illustrates example operations for processing a request for access to user data from a partner entity to a trusted platform.

With further reference to FIG. 15, example operations 1500 for processing a request from a partner are illustrated. The operations 1500 may include a receiving operation 1502 in which instructions are received to initiate execution of a partner program in a TEE of a user's secure user profile. This may include deploying the partner program from a kernel store of the trusted platform. Furthermore, a related partner program may also be deployed to a user device. The related partner program may be provided within an environment for interaction with the trusted platform such as an application launchpad within an application for the trusted environment. An initiating operation 1504 may initiate execution of the partner program in the secure user profile (e.g., in the TEE of the secure user profile).

A receiving operation 1506 may receive a request to access secure storage from the partner program. The request may include request parameters including the requesting entity (e.g., which may be automatically established as the partner associated with the partner program), the requested user data, an intended use of the data, etc. A recording operation 1508 may record the request in a ledger.

A retrieving operation 1510 may retrieve access permission parameters associated with the request. In turn, the request may be analyzed in view of the access permission parameters in a determining operation 1508 to determine if the request complies with the access permission parameters. If the request does not comply with the access permission parameters, the request may be denied in a denying operation 1514 and the denial of the request may be recorded in the ledger in the recording operation 1516. If, in contrast, the request is approved in view of the access permission parameters, an allowing operation 1518 may allow the partner program executing in the secure user profile access to the requested user data. In this instance, a recording operation 1520 records the grant of the access to the requested user data and may also record what data is access or used by the partner program.

Figure 16:
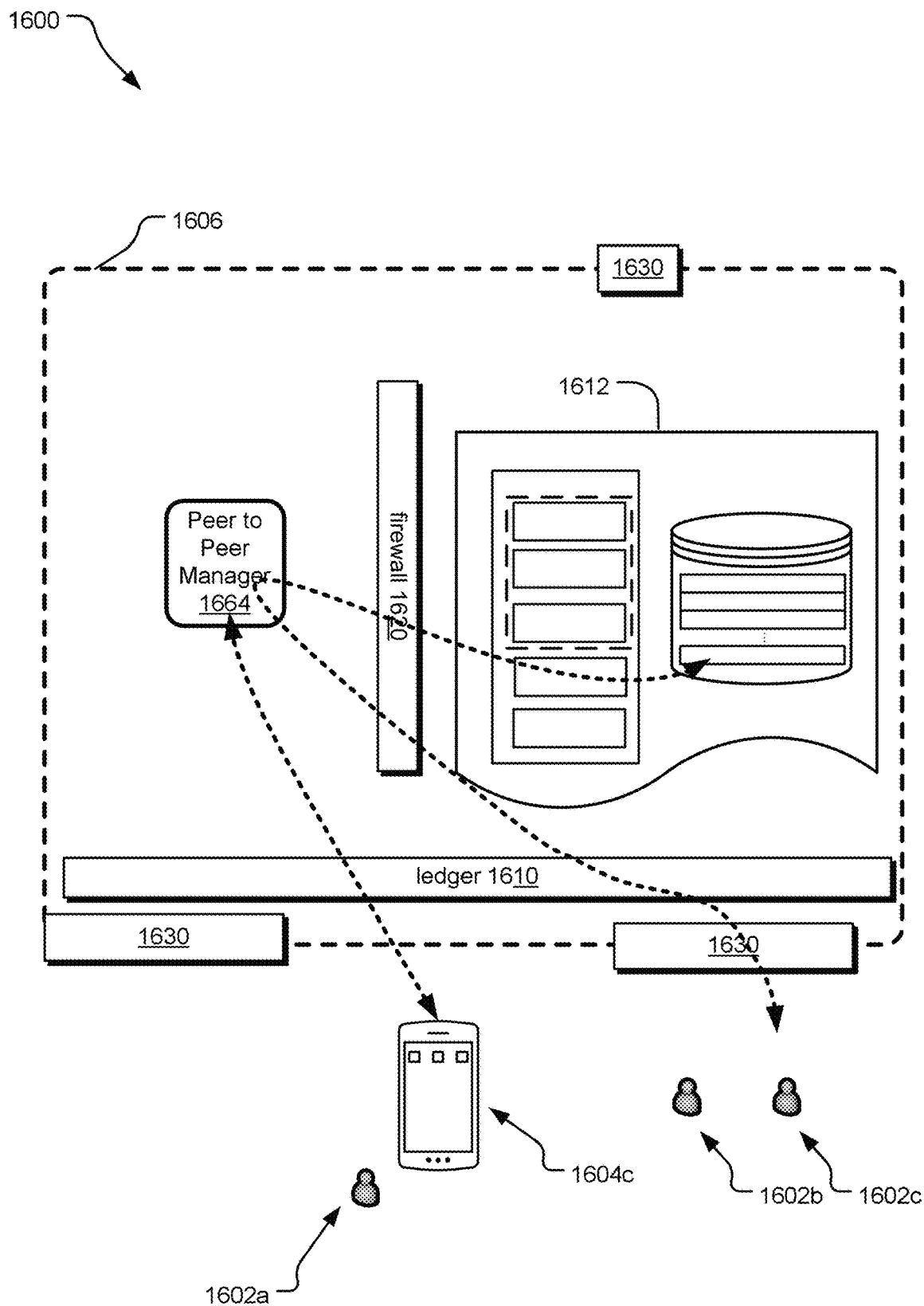
FIG. 16 illustrates an example of components of a trusted platform involved in processing a request for access to user data from a peer user.

FIG. 16 illustrates an example of a trusted platform 1606 shown only with participating components in the processing of requests from peer users 1602b, 1602c for purposes of clarity. A user 1602a may use a user device 1604a to interact with a peer to peer manager 1664 to establish access permission parameters for peer users 1602b, 1602c of the trusted platform 1606. Peer users 1602b, 1602c may correspond to users that also have secure user profiles on the trusted platform 1606. In this regard, a peer user 1602b or 1602c may request access to user data associated with user 1602a. In such a case, the request may be received at the peer to peer manager 1664 through a security gateway 1630 that establishes secure communication between a user device of the peer user 1602b or 1602c and the trusted platform 1606. The peer to peer manager 1664 may analyze the request from the peer user 1602b or 1602c and retrieve access permission parameters associated with the request. Based on the determination of whether access to the requested user data behind a firewall 1620 is allowed by the access permission parameters, requested user data may be shared with a peer user 1602b or 1602c. This sharing may include communicating the requested user data from the secure user profile 1612 for the user 1602a to a secure user profile 1612 corresponding to the peer user 1602b or 1602c such that the data is communicated between the secure user profiles in the trusted platform 1606. In this regard, the trusted platform 1606 may retain control over all user data as the user data is not communicated outside the trusted platform 1606. In this regard, should a user 1602a change the access permission parameters to limit or revoke the access to the peer user 1602b or 1602c, such change may be effectuated to preclude further access to the requested user data that has previously been granted or for future requests for such requested user data.

Figure 17:
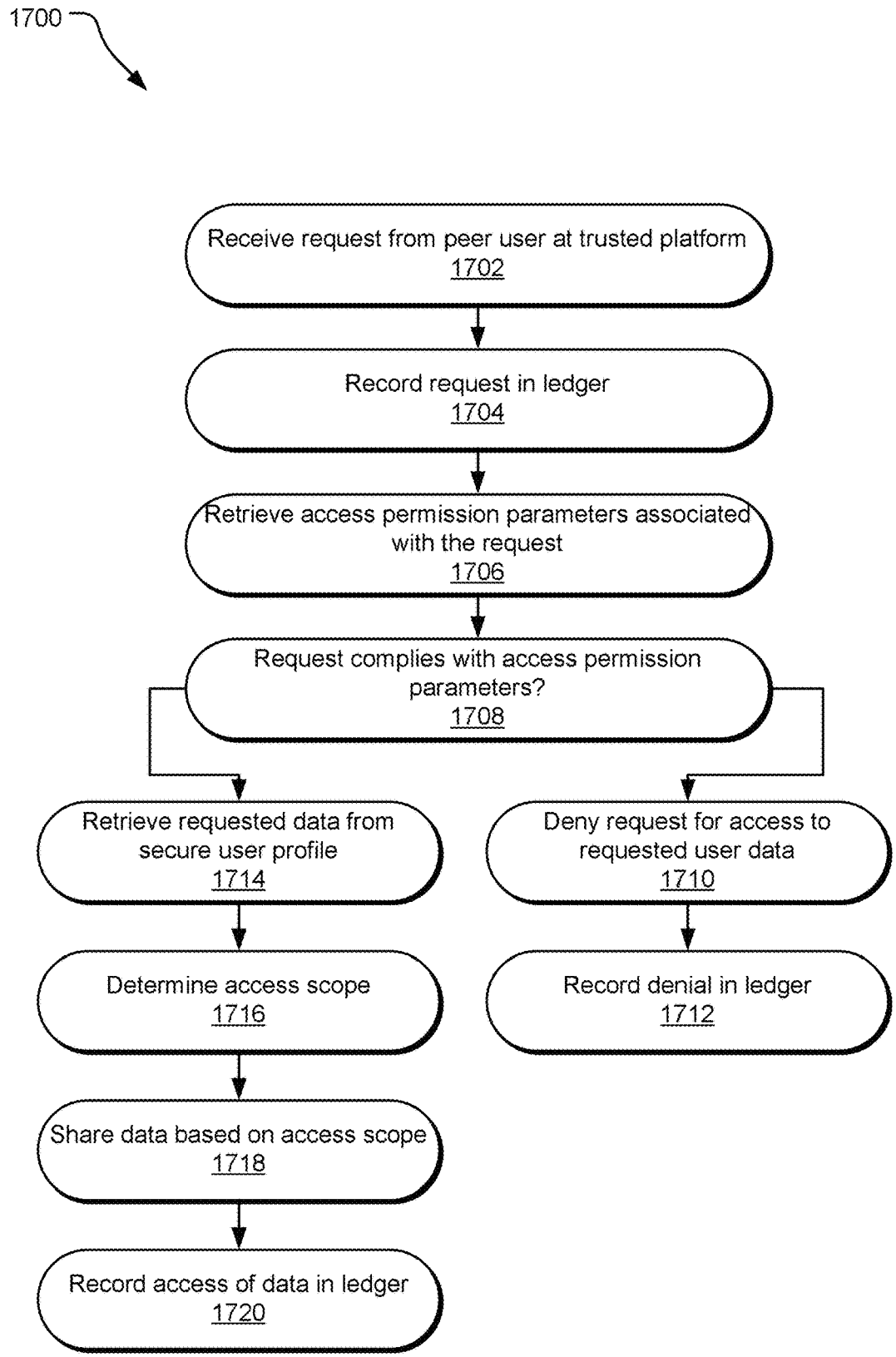
FIG. 17 illustrates example operations for processing a request for access to user data from a peer user.

With further reference to FIG. 17, example operations 1700 for processing a request from a peer user are illustrated. The operations 1700 include a receiving operation 1702 in which a request from a peer user is received. A recording operation 1704 may record the request in a ledger. A retrieving operation 1706 retrieves access permission parameters for the request. A determining operation 1708 determines whether the requested user data may be accessed in view of the access permission parameters. If it is determined that the requested user data cannot be accessed by the peer user, a denying operation 1710 denies the request and a recording operation 1712 records the denial in the ledger.

If the determination operation 1708 determines that access is allowed in view of the access permission parameters, a retrieving operation 1714 may access the secure storage of the secure user profile of the user. A determining operation 1716 may determine the scope of access provided to the peer user. For example, a user may provide a grant of access to the peer user such that the peer user may access the requested data, but does not receive the requested user data (e.g., at the secure user profile of the peer user). In this regard, should the user elect to revoke access to the requested data, the peer user may no longer access or otherwise have possession of the requested data. However, the user may provide access permission parameters that allows sharing of the requested data with the peer user. In this case, the requested user data may be granted to the peer user. In such an instance, the peer user may be able to control the granted user data. A later revocation of the grant may preclude further access to the requested user data, but granted user data that the peer user previously obtained may not be controlled by the user. A revocation message may be provided to the peer user and documented in the ledger, but the peer user may have migrated such granted user data outside of the trusted platform, such that compliance with the revocation may not be enforced by the trusted platform. In any regard, the access of the requested user data may be recorded in a ledger in a recording operation 1720.

In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

A method of trusted deployment and execution of partner applications includes receiving, at a trusted platform, a request from a trusted partner for deployment of a signed application kernel, determining one or more data specifications for the data to be used by the signed application kernel, receiving from the trusted partner, instructions for the signed application kernel within a secured application development environment, testing compiled instructions for the signed application kernel to verify the signed application kernel's compliance with the one or more data specifications, generating a signed application kernel upon verification of the signed application kernel's compliance with the one or more data specifications, and deploying the signed application kernel in a kernel store of the trusted platform. An implementation further includes providing the trusted partner secured access to the application development environment hosted within a trusted execution environment (TEE) of the trusted platform.

In an alternative implementation, the data specification further comprises one or more of data access specifications, data control specifications, data storage specifications, data retention specification, data aggregation specifications, and data usage specifications. Alternatively, the data specifications further comprises data insight access specifications. Yet alternatively, an implementation further includes verifying the signed application kernel's communication with the trusted partner application on a device outside of the trusted platform to determine the signed application kernel's compliance with the data specifications.

In another implementation, testing compiled instructions for the signed application kernel further comprises testing compiled instructions for the signed application kernel to verify that the execution of the compiled instruction does not result in user data being communicated outside of the trusted platform. Alternatively, testing compiled instructions for the signed application kernel further comprises testing compiled instructions for the signed application kernel to verify that the execution of the compiled instruction does not generate personally identifiable insights based on the user data.

Another implementation further includes removing the signed application kernel form the kernel store in response to a determination that the execution of the signed application kernel results in violation of one or more of the data specifications. Another implementation further includes tracking usage characteristics of the signed application kernel. Another implementation further includes, logging the usage of the signed application kernel into a ledger.

A trusted platform for deployment of trusted applications includes a secure user profile comprising user data specifications that is stored in a secure storage location of the trusted platform, a kernel development engine configured to receive various application program instructions within a trusted environment, a testing and signing module configured to generate signed application program instructions in response to determining that the application program instructions do not violate one or more of the data specifications, a compiler configured to compile the signed application program instructions to generate a signed application kernel, and a kernel store configured to store the signed application kernels that are executable in the trusted platform. In one implementation, the testing and signing module is further configured to test the signed application kernel to verify that execution of the signed kernel does not violate one or more of the data specifications.

In another implementation, the kernel store is configured to provide the trusted partner secured access to the application development environment hosted within a trusted execution environment (TEE) of the trusted platform. Alternatively, the data specification further comprises one or more of data access specifications, data control specifications, data storage specifications, data retention specification, data aggregation specifications, and data usage specifications. Yet alternatively, the kernel store is further configured to allow the signed application kernel access user profiles stored on a TEE via an internal firewall in the TEE. Alternatively, the kernel store is further configured to allow the signed kernel application to communicate with a trusted partner application on a device outside of the trusted platform using a security gateway. Yet alternatively, the kernel store is further configured to store activity of the signed application kernel in a ledger.

In one implementation, the kernel store is further configured to verify the signed application kernel's communication with a trusted partner application on a device outside of the trusted platform to determine the signed application kernel's compliance with the data specifications. Alternatively, the testing and signing module is further configured to remove the signed application kernel form the kernel store in response to a determination that the execution of the signed application kernel results in violation of one or more of the data specifications. Yet alternatively, the testing and signing module is further configured to test compiled application program instructions for the signed application kernel to verify that the execution of the compiled application program instructions do not generate personally identifiable insights based on the user data. Alternatively, the kernel store is further configured to usage characteristics of the signed application kernel. Alternatively, the kernel store is further configured to generate additional user data from the usage of the signed application kernels. In another implementation, the kernel store is further configured to share the additional user data generated from the usage of the signed application kernels with other users based on data specification.

One or more tangible processor-readable storage media embodied with instructions for executing, on one or more processors and circuits of a device, a process of managing requests for access to user data including receiving, at a trusted platform, a request from a trusted partner for deployment of a signed application kernel, determining one or more data specifications for the data to be used by the signed application kernel, receiving from the trusted partner, instructions for the signed application kernel within a secured application development environment, testing compiled instructions for the signed application kernel to verify the signed application kernel's compliance with the one or more data specifications, generating a signed application kernel upon verification of the signed application kernel's compliance with the one or more data specifications, and deploying the signed application kernel in a kernel store of the trusted platform.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of trusted deployment and execution of partner applications, the method being implemented on or more non-transitory processor-readable storage media embodied with instructions for executing, on one or more processors and circuits of a device, and the method comprising:
   receiving, at a trusted platform implemented using the one or more processors, a request from a trusted partner for deployment of a signed application kernel;
   receiving one or more data specifications for the data to be used by the signed application kernel, the data specifications being in the form of one or more metadata for one or more databases and comprising one or more of data access specifications, data control specifications, data storage specifications, data retention specification, data aggregation specifications, and data usage specifications;
   receiving from the trusted partner, instructions for the signed application kernel within a secured application development environment;
   testing compiled instructions for the signed application kernel to verify the signed application kernel's compliance with the one or more data specifications;
   generating a signed application kernel upon verification of the signed application kernel's compliance with the one or more data specifications;
   deploying the signed application kernel in a kernel store of the trusted platform, wherein the signed application kernel in the kernel store of the trusted platform is configured to communicate with a trusted partner application on a device outside of the trusted platform using a security gateway; and
   verifying the signed application kernel's communication with the trusted partner application on a device outside of the trusted platform to determine the signed application kernel's compliance with the data specifications.

2. The method of claim 1, further comprising providing the trusted partner secured access to the application development environment hosted within a trusted execution environment (TEE) of the trusted platform.

3. The method of claim 1, wherein the data control specifications specifying that the data may only be communicated through a secured gateway provided by the trusted platform.

4. The method of claim 1, wherein the data specifications further comprises data insight access specifications.

5. The method of claim 1, wherein testing compiled instructions for the signed application kernel further comprises testing compiled instructions for the signed application kernel to verify that the execution of the compiled instruction does not result in user data being communicated outside of the trusted platform.

6. The method of claim 1, wherein testing compiled instructions for the signed application kernel further comprises testing compiled instructions for the signed application kernel to verify that the execution of the compiled instruction does not generate personally identifiable insights based on the user data.

7. The method of claim 1, further comprising removing the signed application kernel form the kernel store in response to a determination that the execution of the signed application kernel results in violation of one or more of the data specifications.

8. The method of claim 1, further comprising tracking usage characteristics of the signed application kernel.

9. A trusted platform for deployment of trusted applications, comprising:
   a secure user profile comprising user data specifications that is stored in a secure storage location of the trusted platform, the data specifications being in the form of one or more metadata for one or more database and comprising one or more of data access specifications, data control specifications, and data storage specifications;
   a kernel development engine, implemented on or more non-transitory processor-readable storage media embodied with instructions for executing, on one or more processors and circuits of a device, configured to receive one or more application program instructions within a trusted environment;
   a testing and signing module configured to generate signed application program instructions in response to determining that the application program instructions do not violate one or more of the data specifications;
   a compiler configured to compile the signed application program instructions to generate a signed application kernel; and
   a kernel store configured to store the signed application kernels that are executable in the trusted platform, wherein the kernel store is further configured to verify the signed application kernel's communication with a trusted partner application on a device outside of the trusted platform to determine the signed application kernel's compliance with the data specifications.

10. The trusted platform of claim 9, wherein the testing and signing module is further configured to test the signed application kernel to verify that execution of the signed kernel does not violate one or more of the data specifications.

11. The trusted platform of claim 9, wherein the kernel store is configured to provide the trusted partner secured access to the application development environment hosted within a trusted execution environment (TEE) of the trusted platform.

12. The trusted platform of claim 11, wherein the data specification further comprises one or more of data retention specification, data aggregation specifications, and data usage specifications.

13. The trusted platform of claim 9, wherein the kernel store is further configured to allow the signed application kernel access user profiles stored on a trusted execution environment (TEE) via an internal firewall in the TEE.

14. The trusted platform of claim 9, wherein the kernel store is further configured to allow the signed kernel application to communicate with a trusted partner application on a device outside of the trusted platform using a security gateway.

15. The trusted platform of claim 14, wherein the kernel store is further configured to store activity of the signed application kernel in a ledger.

16. The trusted platform of claim 9, wherein the testing and signing module is further configured to remove the signed application kernel form the kernel store in response to a determination that the execution of the signed application kernel results in violation of one or more of the data specifications.

17. The trusted platform of claim 9, wherein the testing and signing module is further configured to test compiled application program instructions for the signed application kernel to verify that the execution of the compiled application program instructions do not generate personally identifiable insights based on the user data.

18. The trusted platform of claim 9, wherein the kernel store is further configured to usage characteristics of the signed application kernel.

19. The trusted platform of claim 9, wherein the kernel store is further configured to generate additional user data from the usage of the signed application kernels.

20. The trusted platform of claim 19, wherein the kernel store is further configured to share the additional user data generated from the usage of the signed application kernels with other users based on data specification.

21. One or more tangible and non-transitory processor-readable storage media embodied with instructions for executing, on one or more processors and circuits of a device, a process of managing requests for access to user data, comprising:
receiving, at a trusted platform implemented using the one or more processors, a request from a trusted partner for deployment of a signed application kernel;
receiving one or more data access specifications for the data to be used by the signed application kernel, the data access specifications being in the form of one or more metadata for one or more databases;
receiving from the trusted partner, instructions for the signed application kernel within a secured application development environment;
testing compiled instructions for the signed application kernel to verify the signed application kernel's compliance with the one or more data access specifications;
generating a signed application kernel upon verification of the signed application kernel's compliance with the one or more data access specifications;
deploying the signed application kernel in a kernel store of the trusted platform, wherein the signed application kernel in the kernel store of the trusted platform is configured to communicate with a trusted partner application on a device outside of the trusted platform using a security gateway; and
verifying the signed application kernel's communication with the trusted partner application on a device outside of the trusted platform to determine the signed application kernel's compliance with the data specifications.

22. The method of claim 8, further comprising logging the usage of the signed application kernel into a ledger.

* * * * *